Figure 4:
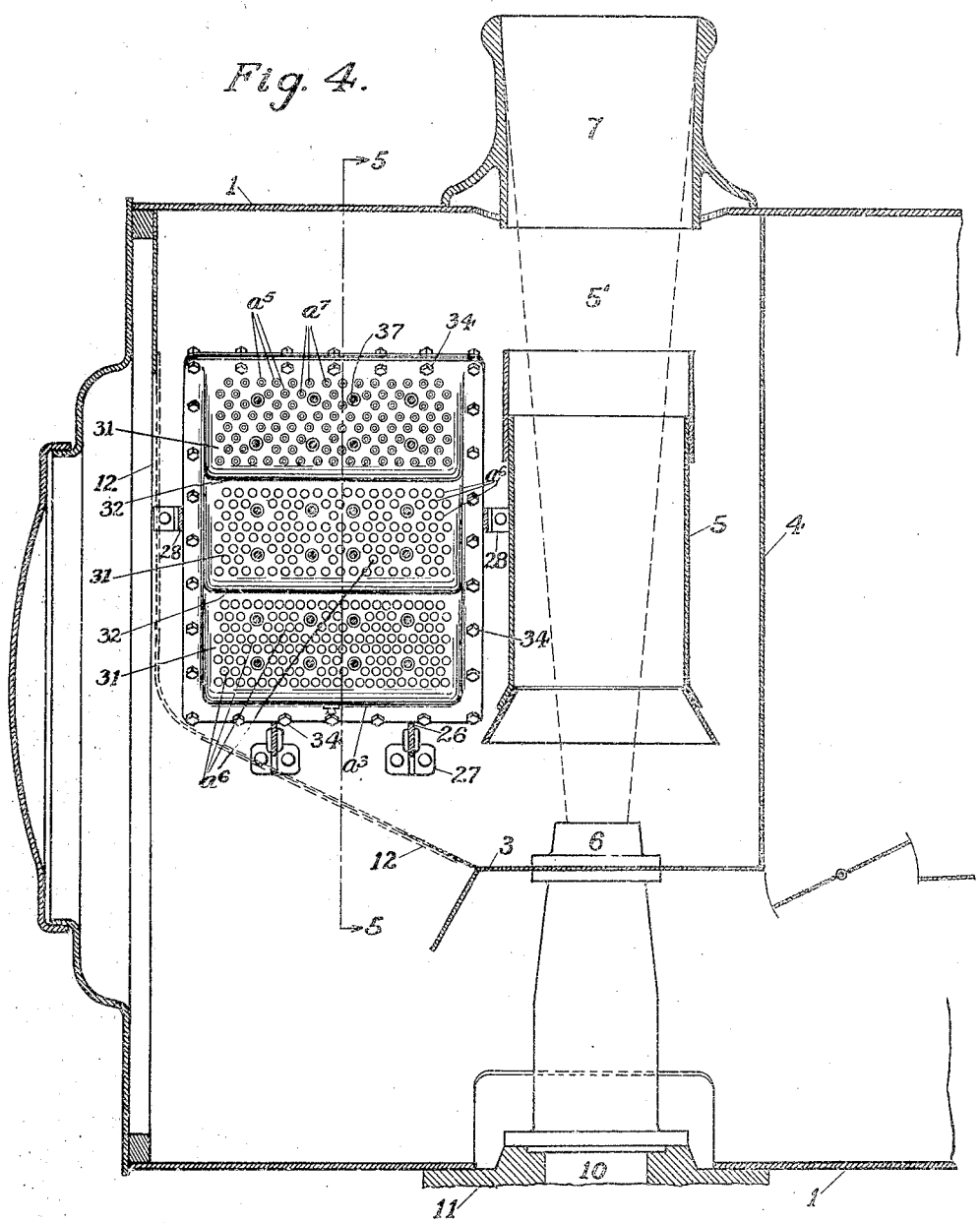

L. G. PLANT.
FEED WATER SUPERHEATER FOR LOCOMOTIVES.
APPLICATION FILED MAR. 28, 1921.
1,435,496.
Patented Nov. 14, 1922.
7 SHEETS—SHEET 1.
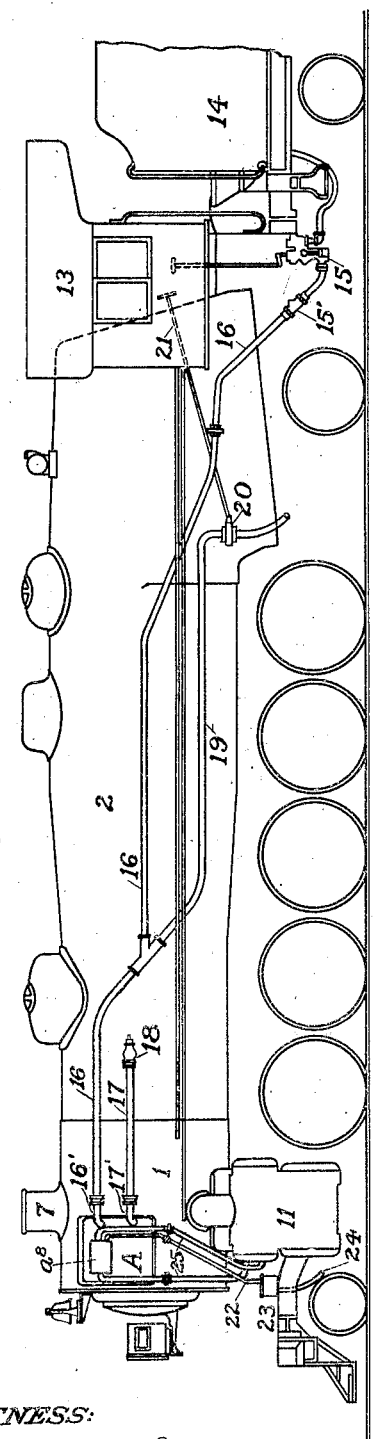
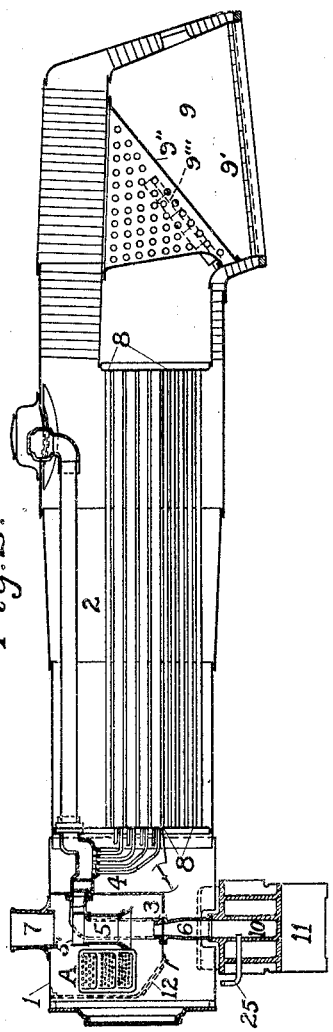
WITNESS:
LELAND G. PLANT,
INVENTOR L. G. PLANT.
FEED WATER SUPERHEATER FOR LOCOMOTIVES.
APPLICATION FILED MAR. 28, 1921.
1,435,496.
Patented Nov. 14, 1922.
7 SHEETS—SHEET 2.
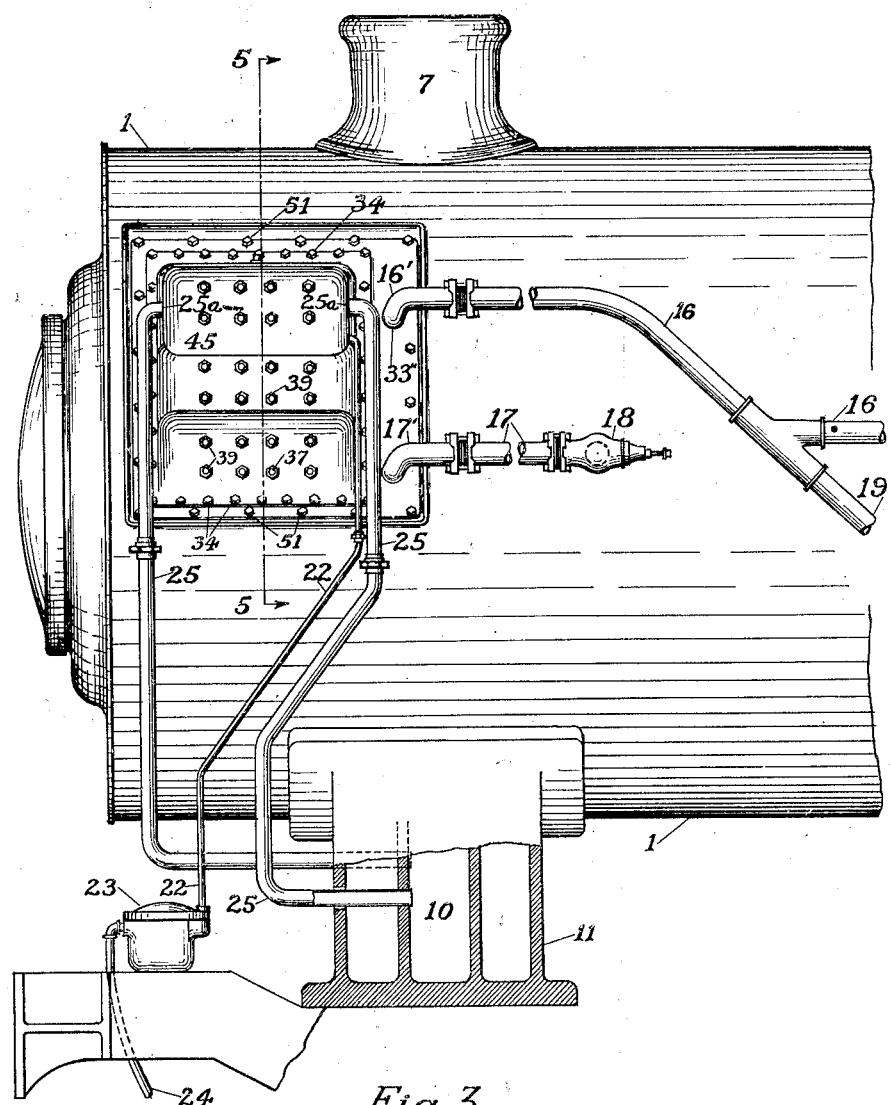
Fig. 3.
WITNESS:
B. S. Larson.
LELAND G. PLANT.
INVENTOR
BY 
ATTORNEY L. G. PLANT.
FEED WATER SUPERHEATER FOR LOCOMOTIVES.
APPLICATION FILED MAR. 28, 1921.

1,435,496.

Patented Nov. 14, 1922.

7 SHEETS—SHEET 6.

LELAND G. PLANT.
INVENTOR

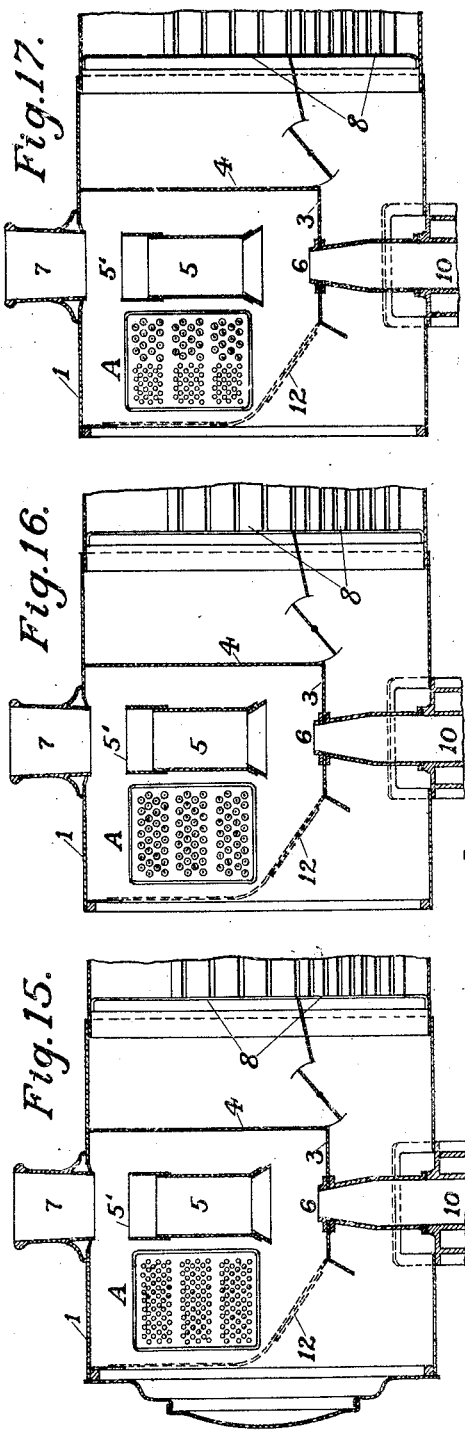
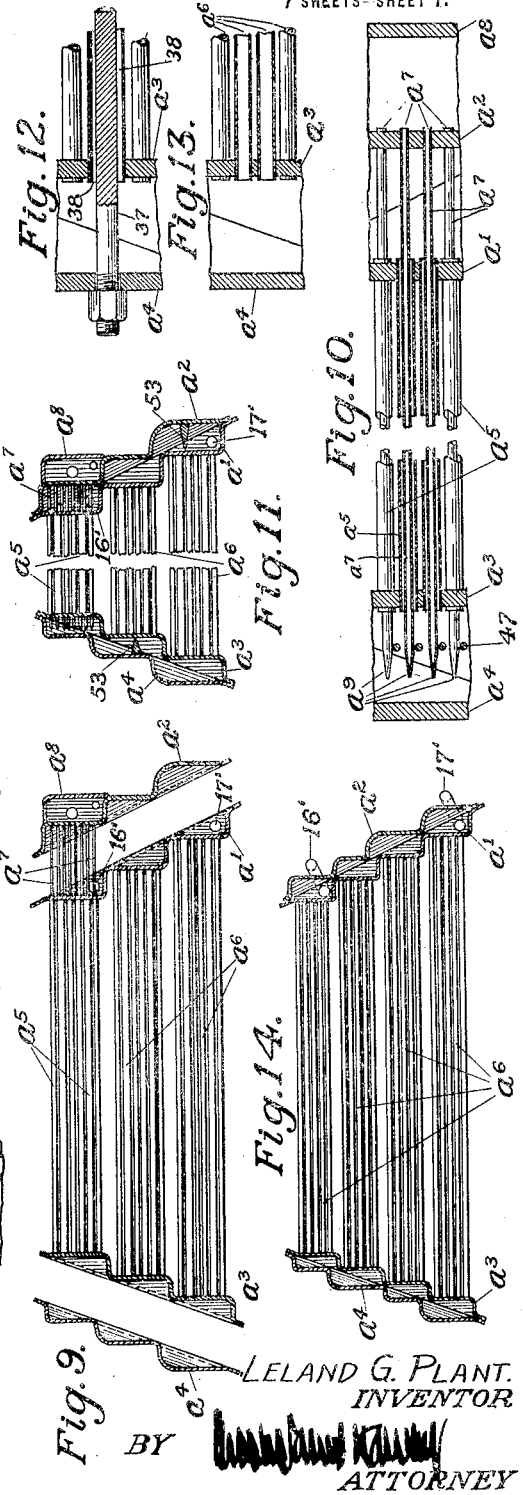

Patented Nov. 14, 1922.

1,435,496

UNITED STATES PATENT OFFICE.

LELAND G. PLANT, OF CHICAGO, ILLINOIS.

FEED-WATER SUPERHEATER FOR LOCOMOTIVES.

Application filed March 28, 1921. Serial No. 456,441.

*To all whom it may concern:*

Be it known that I, LELAND G. PLANT, a citizen of the United States, formerly a resident of the city and State of New York, and now a resident of the city of Chicago, county of Cook, and State of Illinois, have invented certain new and useful Improvements in and for Heating and Purifying the Feed Water for Steam Locomotives, all as described in the following specification, entitled, "Feed-water superheaters for locomotives."

My invention relates to improvements in steam locomotives and comprises an improved method and related apparatus reliably adapted to impart to the locomotive feed-water the heat of the boiler flue gases and when desired also the heat of exhaust steam, thus to utilize much of the heat that otherwise would be wasted through the locomotive stack; and all to the end that the steaming capacity of such boilers shall be relatively increased and that less fuel shall be consumed in generating the steam required for the operation of the locomotive.

In various parts, this application is a continuation of each of the four applications which I filed in the Patent Office on June 14, 1919, under the respective Serial Numbers 304,134; 304,135; 304,136; and, 304,137; all of which have been abandoned in favor of this application.

As will presently appear the body portion of my feed-water superheater is composed of a large number of water tubes combined with suitable headers, and through which the feed-water from the locomotive tank or tender passes on its way to the boiler. It is positioned within the "front-end" or smoke-box of the locomotive and presents several hundred square feet of heating surface for the absorption of heat from the firebox flue gases. These enter the "front-end" at temperatures usually ranging from five hundred to one thousand degrees Fahrenheit; hot enough to raise the feed-water to a higher temperature than can be obtained from any other source of waste heat.

Without re-designing a locomotive front-end and thereby increasing its cost or jeopardizing its essential operations, it is not possible to use even the greater part of the space within a front-end for the reception of water heating elements. Hence at best their number is limited; and, as disclosed herein, it is highly desirable that as far as possible the front-end feed-water shall be wholly devoted to raising or superheating the feed-water from the front-end gases; that is, to temperatures above those lower increments which more readily can be obtained from a steam feed-water injector; or as a matter of heat economy, from a feed-water heater of the exhaust steam type.

In the complete forms which best adapt my feed-water heating apparatus for general application to the front-ends of all locomotives, the apparatus either contains or embraces a feed-water heater of the exhaust steam type which utilizes exhaust steam in a preliminary manner; that is, only in a manner which still permits the feed-water to take on the higher temperatures of the flue gases. This included heater is also of my invention and very effectively may take the place of any separate or external feed-water heater of the exhaust steam type.

My predecessors in this art have proposed front-end feed-water heaters of various constructions; and in several instances there was a recognition of the need for very extensive water heating surfaces within the front-end; and, in several there was an attempt to enforce the needed intimacy of contact between the gases and the heating surfaces; yet all have failed for one or several reasons, the chief of which I shall explain herein.

Thus on examination of such older devices it will be observed that in every case the matter of initial cost was virtually ignored, and that the difficulties consequent upon any departure from proven front-end constructions and practices, either were not understood or were disregarded. Also in every instance, an enlargement or other modification served to defeat the primary and delicate purposes of the front-end with respect to the development and distribution of the draft in the locomotive firebox, upon which the burning of the fuel and generation of the steam depends. Likewise, in every case, the front-end, in order to accommodate the heater, was so altered as to deprive it of the self-cleaning or automatic cinder discharging ability now regarded as essential. And in some cases, the front-end was so obstructed as to permit accumulations of cinders to shut off the draft and thus bring about a "failure" of the locomotive.

Further, the feed-water which reaches the boiler from the locomotive tank or tender commonly contains soluble scale-forming impurities which the application of heat quickly precipitates, and also contains insoluble impurities which, in a sluggish flow, clog the water spaces and courses. The heating of such water in a feed-water heater is therefore accompanied by the coating and clogging of the water heating surfaces with scale and sediment that greatly reduce the heat transmitting capacity thereof; and, if not removed, such deposits ultimately close the water passages in the heater. Hence, no feed-water heater can be regarded as complete or useful unless its construction is such as to enable the easy removal of internal deposits; and obviously no heater is acceptable unless the cleansing thereof can be accomplished at very low cost, either automatically or at frequent intervals. Otherwise the deterioration of the heater and the cost of its maintenance would quickly overbalance any possible savings effected thereby.

Again, in constructing and applying a front-end feed-water heater to a locomotive, special consideration must be given to the fact that the fire box gases which pass through the front-end, are loaded with vapors and solids that tend to precipitate and cake upon the gas exposed surfaces of any feed-water heating element which may occupy the front-end. Further, certain of these vapors are charged with sulphur and if permitted to condense upon the water heating elements quickly corrode and pit the metal, ultimately destroying the heater. Hence it is to be observed that no front-end feed-water heater can be made successful in the absence of definite provisions for keeping its gas exposed surfaces clean and at non-condensing temperatures.

On further study of the older devices it will be observed that some of my predecessors provided for an infrequent and laborious internal cleaning of the water courses, but all failed to make simple or complete provisions to that end; and, it is to be further noted that all of them failed to comprehend the difficulties presented by the foulness of the flue gases, or at least neglected to keep the gas exposed heating surfaces clean and dry. Thus, just as the vital problems of the locomotive front-end were disregarded, so these matters of internal and external cleanliness seem to have been passed without recognition or at least regarded as impossible of simple solution, which facts fully explain the failure of all previously proposed front-end heaters.

One important object of my invention is to provide within a locomotive front-end, a feed-water heater of the multiple-tube type which, as to its external or gas exposed surfaces, shall be self-cleaning and at the same time not interfere with the ordinary constructions or functions of the front end; also to provide for the frequent "blowing-out" of such heater while the locomotive is under steam and for the complete internal cleaning of the heater by ordinary boiler methods when not under steam pressure. Therefore by my invention I make adequate provision for the quick and inexpensive cleaning of the interior of the water heater; and, as to the foul front-end gases, successfully use them to clean and maintain the gas exposed surfaces of the heater in unimpaired condition.

New locomotives, while yet in the hands of the designers doubtless afford opportunities for the construction of special boilers adapted to receive extensive feed-water heating elements but this has always been done at the expense of sacrificing space ordinarily and more profitably occupied by the steam generating portion of the locomotive boiler. Moreover, if thus provided with feed-water heaters, such locomotives, aside from the added cost, would be objected to on the ground of lack of standardization with the many locomotives already in use.

It will now be evident that the real problems of heating locomotive feed-water are presented by the great number of locomotives already in service and which cannot profitably or safely be modified or reconstructed to receive feed-water heaters.

At this point it may be noted that the exhaust steam feed-water heaters used externally on some locomotives, in a measure, meet the indicated requirement for minimum alteration in the locomotive; but they fall short, through being limited to the comparatively low temperature of exhaust steam and if economies commensurate with the cost thereof are to be secured, it is necessary to equip each such heater with an expensive water pump, in lieu of the simple steam feed-water injector with which every locomotive is normally supplied. Therefore a special object of this invention is to provide a front-end heater which shall be adapted to supply feed-water to the locomotive boiler at temperatures exceeding that of exhaust steam and with a degree of heat economy equaling or exceeding the best obtainable from an exhaust steam feed-water heater whether or not supplied by a feed pump; also to provide a front-end feed-water heater that shall be peculiarly adapted for use in conjunction with a steam feed-water injector, whereby to avoid the use of an expensive feed-water pump.

My chief purpose herein is to provide a front-end feed-water apparatus which shall obviate and turn to advantage the limitations and difficulties that have defeated others in this art, which shall be universally adapted to both old and new locomotives and the use of which shall not entail costs or expenses disproportionate to the benefits derived therefrom; and to these ends, my invention comprises a front-end feed-water heater which is added to a locomotive without material alteration or readjustment of the related parts of the locomotive, which so utilizes the related locomotive parts and operations as thereby to be kept in a state of high efficiency and which is of such ample capacity, such small cost, so easy to apply and so cheap to maintain that its use ensures the enjoyment of large net gains and advantages.

A further object of the invention is to provide, and my invention comprises, a front-end feed-water heater of a multiple tube type that adapts it for use with both flue gases and exhaust steam; and by preference admits of the assistance of the steam heat without limiting the feed-water to the temperature thereof, and in either form definitely ensures the continued heating of the feed-water by the flue gases at times when the exhaust steam is shut off, so that cold water cannot enter the boiler while there is a fire in the locomotive.

Further the invention comprises a feed-water heater utilizing exhaust steam and which occupies an elevated position in the locomotive front-end, which position provides for the reliable discharge of the water of condensation by gravity and if desired, or its gravity return to the locomotive tank or tender.

My invention also comprises a feed-water heater so combined with the front-end, that the heater may be opened, inspected and cleaned from the exterior of the front-end without "opening" the latter or removing the heater therefrom.

Importantly my invention comprises a front-end feed-water heater of a unitary or completely assembled form, and which is detachably positioned in the front-end and withdrawable through one wall thereof; so that without dismemberment and without "opening" the front-end it may be disconnected and withdrawn therefrom; as for inspection, cleaning or repair, or to vacate the front-end and enable necessary work to be done therein; and particularly to the end that the heater may be quickly replaced by a like heater at any time, thus avoiding the laying up or "shopping" of the locomotive even in event of a heater failure.

My invention further comprises a readily removable heater of the character described, which occupies the upper part of the locomotive front-end and yet neither modifies the general appearance thereof nor obstructs the forward vision of the enginemen in the locomotive cab.

My invention also comprises a special front-end heater mounting whereby heaters of a given single size are adapted for interchangeable employment in and upon any desired number of locomotives, including various classes that have front-ends of several different sizes and shapes.

Still further objects and features of my invention will appear hereinafter.

The novel manner in which I overcome the obstacles above pointed out and the novel construction and principles of the apparatus whereby and wherein I attain the above recited objects are all more fully described and claimed hereinafter; and, will be readily understood on reference to the drawings that form a part of this specification, wherein I have shown the best embodiments of my invention.

Figure 5:
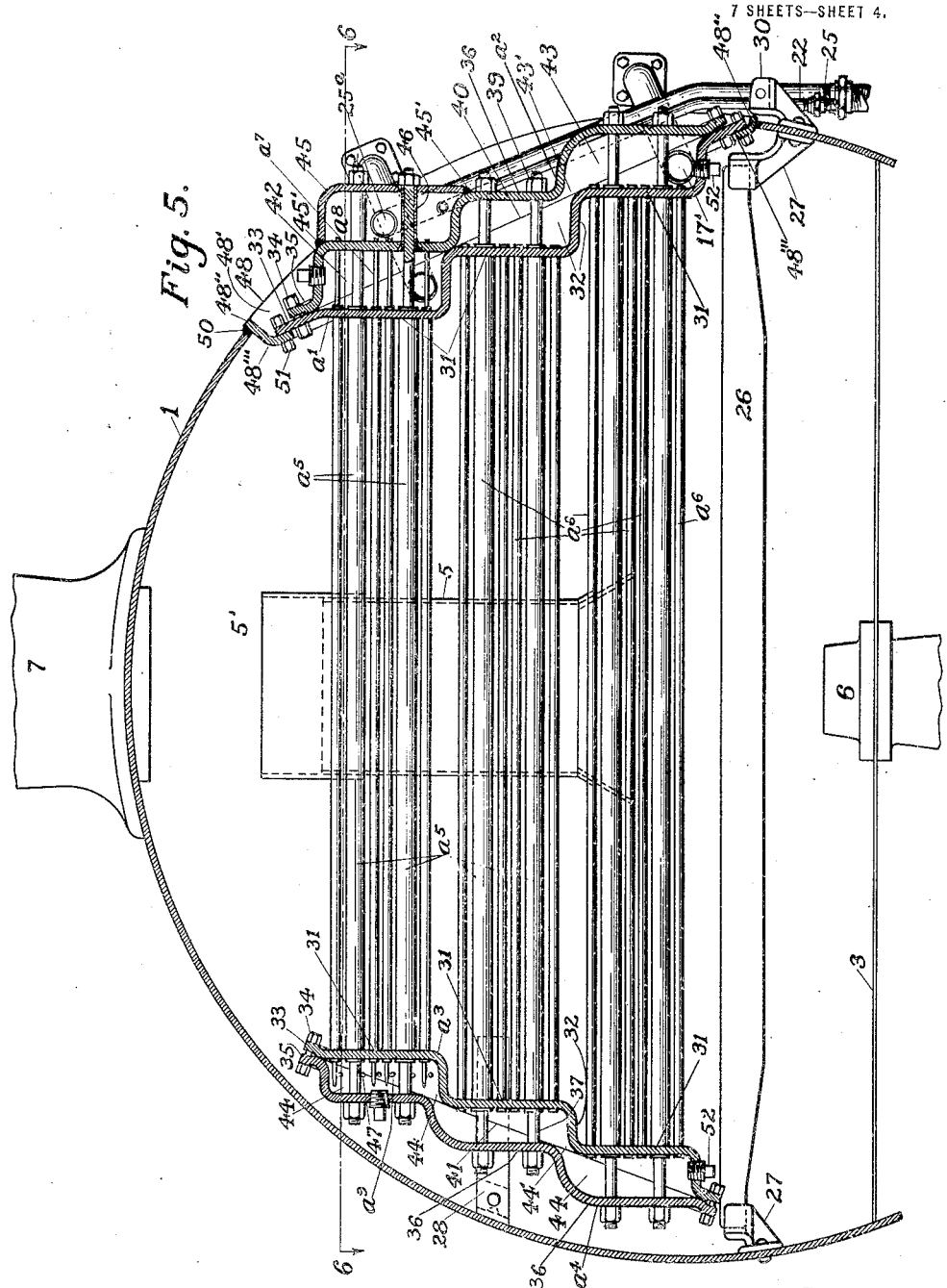
Figure 6:
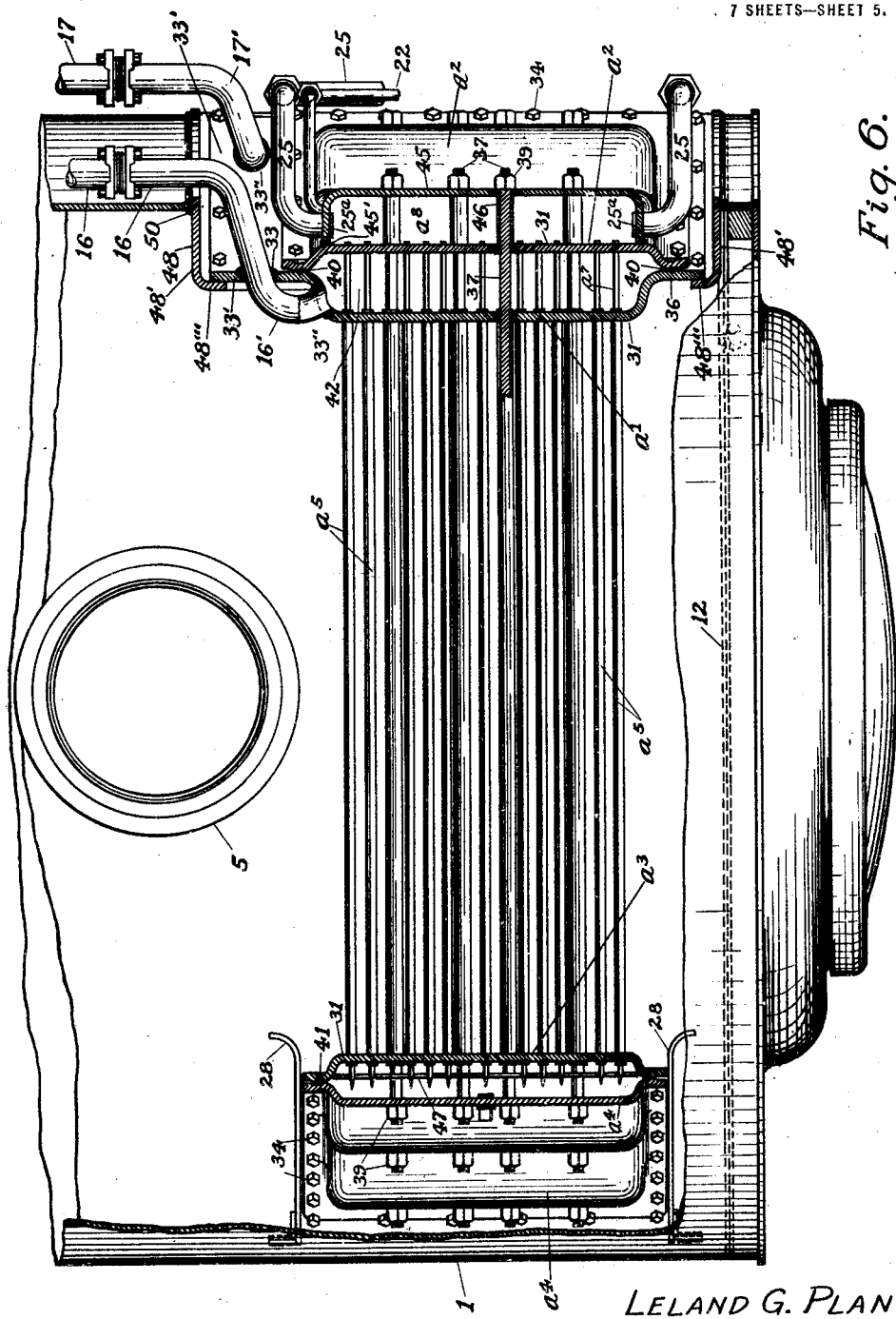
Figure 7:
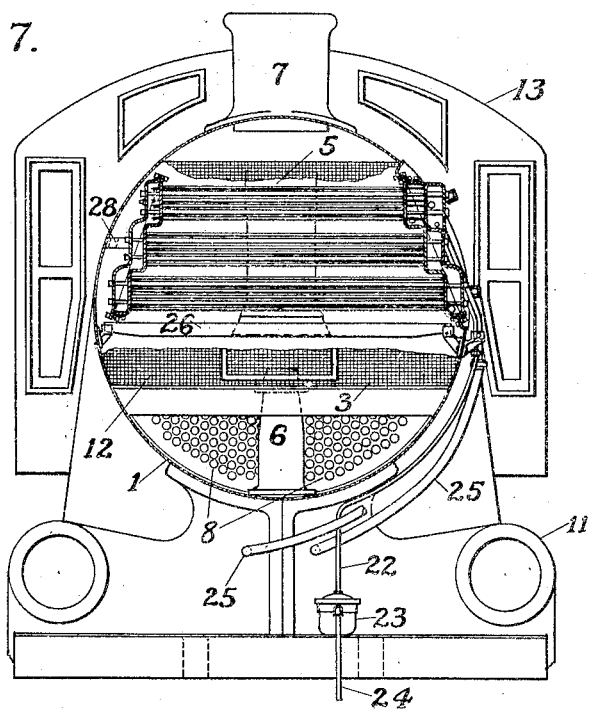
Figure 8:
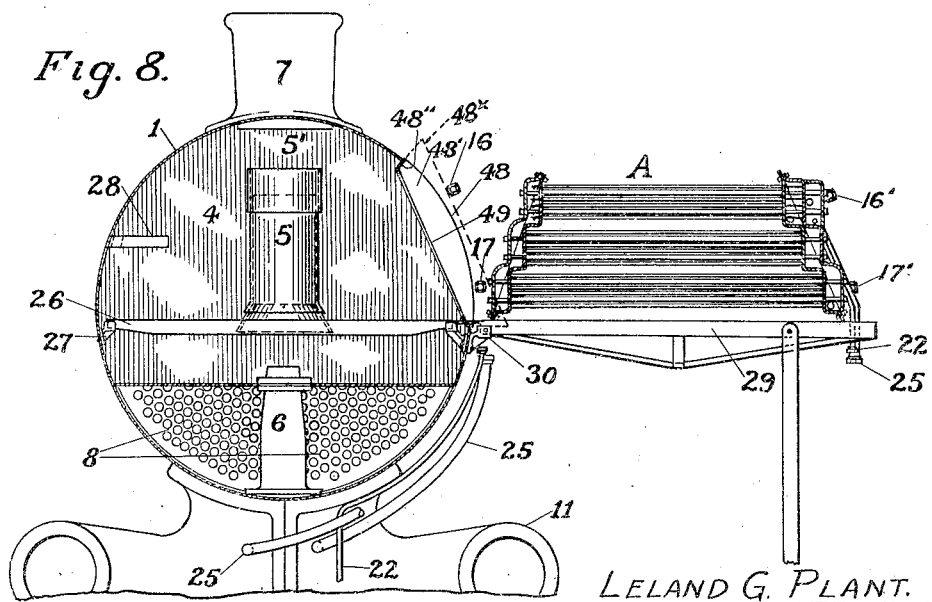

In the drawings, Fig. 1 is a side elevation of a steam locomotive embodying my invention; Fig. 2 is a vertical longitudinal section of the boiler and front-end thereof; Fig. 3 is an enlarged side elevation of the front-end of the locomotive, depicting my novel feed-water super heater and the piping therefor; Fig. 4 is a vertical, longitudinal section of the front-end, further enlarged, and clearly disclosing my feed-water heater and adjuncts; Fig. 5 is a vertical transverse section, enlarged, on the line 5—5 of Figs. 3 and 4; Fig. 6 is a horizontal section substantially on the line 6—6 of Fig. 5; Fig. 7 is a front elevation of the locomotive, showing some of the parts broken away to disclose not only the location of the heater, but also the form and arrangement of its water courses; Fig. 8 is a similar view showing the heater removed from the front-end or smoke-box; Fig. 9 is a detailed sectional view of the heater, showing the caps of the headers removed from the body thereof; Fig. 10 is an enlarged sectional detail of the upper bank of tubes in the heater, which receive exhaust steam; Fig. 11 is a sectional view like unto Fig. 9 but showing the header caps in place and disclosing added partitions in the headers for multiplying the turns in the water course; Fig. 12 is a sectional detail illustrating the application of the stay bolts which enter the header caps; Fig. 13 is a sectional detail of a bank of gas-heated tubes; Fig. 14 depicts an all-gas-heated form of my invention and water course defining headers that are appropriate thereto; Fig. 15 is a vertical longitudinal section of a boiler front-end containing a heater of my invention in which all of the heating elements are of the kind which receive heat only from the exterior; Fig. 16 is a similar view depicting a heater in which all of the heating elements receive heat internally from exhaust steam and externally from exhaust gases and such as might be used with a feed-water pump, rather than an injector; Fig. 17 depicts a modification of the heater of Fig. 4, being a different grouping of the two kinds of heating elements.

Fig. 1 discloses a modern locomotive as it appears when equipped with my invention in combination with a steam-operated feed-water injector of the usual type. It may at once be mentioned that any suitable device may be substituted for the ordinary injector; but I prefer the latter for reasons hereinbefore and hereinafter explained. My feed-water superheater proper is operatively interposed between the water injector and the boiler. If desired it may be coupled with both of the injectors ordinarily found on a locomotive. For sake of clarity of illustration, I have shown it connected with only one thereof.

In Figs. 1, 2, 7 and 8 the feed-water heater proper is identified by the general reference letter, A. I insert this heater through an opening in the side of the smoke-box or front-end, 1, of the boiler, 2. Usually my heater is composed of two main headers and a large number of tubes which connect them. It extends transversely across the front-end, thereby occupying the best position to receive the perpendicular or maximum impact of the upward sweeping products of combustion from the boiler flues. As best shown in Fig. 7 it is positioned back of the cinder screen 12, above the table-plate, 3, of the smoke-box, forward of the diaphragm, 4 (of which the table plate is a part), and forward of the stack extension or petticoat pipe, 5. The latter now serves both as a guard or shield which enables the heater to be placed in close proximity to the exhaust blast without injury, and as a means for controlling the gas flow through the heaters by adjustment of the opening, 5', immediately below the stack, also by adjusting the height of the shield, 5, above the table-plate. The petticoat is of the top and bottom draft type, presenting said opening, 5', at the base of the stack proper to ensure a main flow of flue gas through the heater. The exhaust nozzle, 6, represents any suitable means for creating a draft or gas movement through the boiler flues, 8, as required to maintain the combustion of fuel in the firebox, 9. The drawing depicts a firebox of the most modern type containing the now well known Nicholson thermic syphon, 9" with its companion arch 9'''.

Placed, as here described, the heater, A, is positioned in the path of the gases flowing from the flues, 8, to the stack; and thus positioned, the heater, A, is also conveniently related to the source of the exhaust steam which I propose to use in part for the heating of the feed-water. It should be noticed, that the heater, A, is inserted or added without modifying the interior arrangements of the front-end and occupies what would otherwise be waste space therein, and further, need not obstruct ordinary acccess to the smoke-box for routine maintenance purposes, and it is removable therefrom as a whole. The source of the exhaust steam, as here depicted, is found in the exhaust passages, 10, which connect the steam chests of the engine cylinders 11, with the exhaust nozzle, 6.

In the case of a coal burning locomotive solid particles are lifted from the fire on the fire-box grate, 9', and are carried out through the flues, 8, along with the hot gas from the fire-box. I employ these solids directly upon the heater, A, as a means of keeping its surfaces clean, but not before I have conditioned the solids for that use. In other words, I reduce the pieces and particles of ash and sintered fuel to such small sizes that they may freely pass between the many heating elements or tubes of the heater along with the hot flue gases thus preventing the clogging the spaces between such tubes. For this purpose, I may employ any suitable cinder-breaking means in the path of the flue gases and always in advance of the heater. An ordinary front-end screen, 12, of a sufficiently fine mesh, serves the purpose admirably.

The back-end of the boiler, 2, carries the cab, 13, and behind that appears the water-and-fuel tender or tank, 14. The water is drawn from the tender, 14, preferably by the steam operated injector, 15, and finds its way to the heater, A, through the branch pipe, 16. As well understood, either live steam or exhaust steam, or both, are used in the injector with the effect of initially raising the temperature of the feed-water drawn from the tender; but except in the case of an exhaust steam injector. no special economy of heat is developed at this point. However, the initial heating of the water by the injector or equivalent primary heater, is an important feature of my invention inasmuch as the relatively hot water supplied to the feed-water superheater proper ensures a non-condensing temperature at the surfaces of its heating elements within the smoke-box.

After passing through the heater, the water leaves the same through a delivery pipe, 17, and enters the boiler through a valve, 18. This valve, 18, is always open during the operation of the heater, but may be closed whenever it is desired to cut out the heater in event of the failure of or accident to, any of its parts or connections, and also when the heater is to be removed from a locomotive.

A further important feature of my invention resides in the blow-off pipe, 19, which leads from the branch pipe, 16, at any convenient point between the injector check valve 15', and the intake 16' of the heater.

This blow-off pipe contains the blow-off valve, 20, which is adapted for easy and frequent operation from the cab, as by means of a rod, 21. By this simple device I provide for the frequent opening of the intake end of the heater to the atmosphere, and hence provide for either brief or protracted reversals of the water flow through the heater. Obviously, when the blow-off valve, 20, is opened, the reversal of flow through the heater, A, is occasioned by the back-flow of water from the boiler through the delivery pipe, 17, and under boiler pressure. By such sudden and necessarily vigorous reversals of the water within the heater, I accomplish the dislodgment of accumulations of sediments therein, and direct them toward the blow-off pipe, 19, and valve, 20, each time discharging considerable sediment and a small quantity of water. A thorough internal cleaning of the heater, A, is accomplished, at any time that the boiler is under pressure, by opening the blow-off valve, 20, for a longer time and allowing a larger quantity of boiler water to sweep out through the heater at the high velocity incident to boiler pressure.

My invention does not stop with the cleansing of the inner surfaces of the heater in the manner next above described. Instead, it comprises a multiple-tube heater proper, which is provided with headers which may easily be opened to afford access with scale-removing tools to every interior surface of the heater. Furthermore, my invention comprehends a heater structure of a unitary nature and one which is so combined with the smoke-box as to permit the removal of the entire heater, in unit form, whenever it is desirable to repair the heater or subject it to a thorough inspection, or a thorough cleaning operation.

My invention comprehends heaters, such as the heater, A, which are suited to the employment of both exhaust steam and flue gases for the heating of the feed-water. And also comprehends heaters in which none of the heating tubes or elements receive exhaust steam; that is adapted to use the flue gases as the only source of heat.

I prefer that all of my heaters shall be characterized by water-heating tubes or elements which are arranged in distinct banks or groups. Those of my heaters which employ exhaust steam are characterized by the presence of steam tubes that are added or positioned within the water tubes of one or all of the groups. Such steam tubes clearly appear in Figs. 4 to 10, inclusive. This adaptation to exhaust steam is obviously accomplished at very small expense and thereby the exhaust steam heating surfaces are incorporated with the device without subtracting from the available gas heat absorbing surfaces thereof or in any way detracting from its maximum effectiveness as a gas heater.

The principal views of the drawings disclose a heater in which the two lower banks or groups of heating elements are of the gas-heated type, while those composing the upper group are of the combined steam-and-gas heated type, the same containing the described internal steam tubes.

As clearly depicted, the water from the primary heater or injector preferably enters the top of the heater through the intake connection, 16', and passes through a bank of combined steam-and-gas heated elements wherein the water is quickly raised substantially to the temperature of exhaust steam. On leaving the upper bank of tubes the water flows through the lower banks of gas-heated elements, wherein its temperature is greatly augmented by the heat from the flue gases. The water leaves the heater through an outlet connection, 17', preferably located at the same end of the heater as the connection, 16', but at the bottom, and flows to the boiler through the delivery pipe, 17, and emergency or cut-out valve, 18.

It will now be apparent that the heating elements of all these groups, comprising my heater are subjected to the hot flue gases, on their way to the stack, 7. At the same time I provide efficient means for applying the exhaust steam to assist in heating the water. This will be seen to be the best practical expedient since within the heat transfer range of exhaust steam temperatures one square foot of exhaust steam condensing surface is equivalent to nearly ten square feet of gas heating surface, so that to refrain from using exhaust steam as a heating medium would either entail the acceptance of lower feed-water temperature at the boiler or a gas heater so enlarged as to be impracticable. But it is to be observed that in my invention the feed-water is first brought in contact with the exhaust steam heating elements in its initial passage through the heater. It is useless to employ an excess of exhaust steam, for its temperature is definitely limited and only that temperature can be imparted to the water. Therefore, I prefer to limit the steam-heated elements to a single group of the gas-heated elements. I have further successfully limited the use of exhaust steam by subjecting the flowing water in the steam-heated elements to the simultaneous action of the hot flue gases upon the exterior of those elements, thereby lessening the volume of exhaust steam that need be used. However, as will appear my main purpose in using exhaust steam is to relieve the gas heater proper from the duty of raising the feed-water from its starting temperature to that of exhaust steam (slightly above 212° F.), which elevation can be more readily obtained by the use of exhaust steam. The effect is to devote the whole gas exposed surface of the heater to raising the water to temperatures that are higher than that of exhaust steam. Also a special object in combining these two functions within a single heater, is to provide a unit structure of obviously lower first cost than would be involved in the construction of separate exhaust steam and gas heaters.

Considered as a unitary structure, my feed-water heater, in preferred form, comprises only two headers and the heating elements or tubes which join them. One header is composed of the tube sheet, $a^1$, and the cap-plate $a^2$. The other header comprises the tube-sheet, $a^3$, and the cap $a^4$. To distinguish the combined or steam-and-gas-heated elements from the simple elements, which are merely gas-heated, I have marked the "combined" tubes $a^5$, and the "simple" tubes $a^6$.

Preferably, all of these elements are straight tubes. Their ends are open, and are fastened in the opposed tube sheets, $a^1$ and $a^3$. The exhaust steam tubes, $a^7$, are positioned within the elements, $a^5$. The tubes, $a^7$, being of smaller diameter, an annular space is left between each tube, $a^7$, and its containing tube, $a^5$. Thus, adequate water passages are provided. The aggregate area of these annular passages always exceeds the area of the intake opening of the heater and the excess provided, more than overcomes the surface resistance incident to the more highly subdivided passageways. In adjusting this aggregate area, my best practice is to fix upon tubing of small size and to employ as many small elements containing condensing tubes as may be required to secure the requisite aggregate cross-section in this subdivided water passage of the heater and also the required aggregate heating surface.

The already indicated cinder-blast cleaning method permits this heater to be composed of relatively small tubular elements, placed close together; in other words, explains how I have made it possible to place a very large number of elements within a comparatively small compass and maintain them in an efficient condition with assurance of obtaining an aggregate heat surface which is ample for the raising of the feed-water to temperature much in excess of that of exhaust steam and with the further advantage of adapting the heating elements to a unitary structure of such compact proportions (size and weight considered) that it may readily be handled into and out of the smoke-box without dismemberment.

By preference I make all of the elements, $a^5$, and $a^6$, of metal tubing of the same size throughout; and the aggregate cross-sectional area and aggregate heating surface presented by the simple gas-heated elements, $a^6$, very considerably exceeds the corresponding area and surface of the combined steam-and-gas portion of the heater.

I prefer that the movement of the water through the simple elements, $a^6$, shall be slower than its progress through the exhaust steam condensing section or portion of the heater, wherein heat is imparted to the water from both the interior and the exterior of the heating elements. Furthermore, this serves to illustrate how, by the mere addition or subtraction of simple elements, my heater can be adjusted to a given locomotive; that is, so contrived as to yield, within the imposed space limits, a very high terminal temperature in the feed-water.

The group of elements, $a^5$, (containing exhaust steam tubes, $a^7$) receives the relatively cool water from the branch pipe, 16, and constitutes a very efficient exhaust steam condenser. The contained tubes, $a^7$, receive the steam and transmit its heat to the surrounding water. I here speak of the efficiency of the device as a condenser, for the purpose of calling attention to the fact that the maximum quantity of heat can be imparted to the water from the exhaust steam only by the condensation of such steam. To ensure the rapid condensation of the exhaust steam, I employ tubes, $a^7$, which are closed at one end and which are open at the other to receive the exhaust steam and discharge the water of condensation. As hereinafter detailed, the water of condensation drains away through a small discharge pipe 22, which may terminate in a suitable steam trap, otherwise there is no outlet from the radiator or condenser for exhaust steam.

I prefer to avoid a definite single direction flow of steam as from one steam header to another, finding such flow unnecessary for the reason that the condensation of steam in these closed-end tubes, $a^7$, progresses with great rapidity and one steam header serves for all thereof. Such condensation in the pipes, $a^7$, is due to the rapid flow of relatively cold water upon the exterior thereof and obviously, such condensation of steam within the pipes, $a^7$, is certain to be accompanied by the entrance of fresh exhaust steam to take its place. By preference, the steam tubes, $a^7$, have their open ends fastened in the cap, $a^2$, and are supplied with exhaust steam from a single steam cavity or header formed in or upon said cap, $a^2$. The remote closed ends of the tubes, $a^7$, are best shown at points, $a^9$, in Figs. 5, 6, and 10. This closed-end condenser-radiator feature is especially admirable for important mechanical reasons, among which may be noted: First, freedom from separable joints within the heater; second, the ability to remove all of the steam condensing pipes, $a^7$, at one time, from a single end of the heater; and the capacity to receive exhaust steam and discharge the water of condensation through a single pocket or header that is common to all the steam tubes. This portion of my invention ultimates in a structure of extreme simplicity, and low cost, as compared with the usual construction and cost of an exhaust steam-operated feed-water heater.

At this point I wish it to be understood that my invention, in its essentials, is by no means limited to the highly efficient steam condensing device or radiator here described, for obviously other forms of heat-radiating steam condensers may be substituted within the water containing elements of my heaters.

The steam enters the tubes, $a^7$, from the header, $a^8$, and is condensed therein. The water of condensation finds its way back into the header, $a^8$; and from thence drains away through a small drain-pipe, 22, extending downward at the side of the smoke-box and preferably terminating in an automatic steam trap, 23, of which 24 is the discharge pipe. Through pipes, 25, the steam-header, $a^8$, of the heater is supplied with exhaust steam from exhaust passages, 10, such as shown in the cylinder-saddle of Figs. 2, 3, 7 and 8. As detailed herein, I prefer that one head of my heater shall be positioned upon the exterior of the smoke-box; and under that condition, the steam-supply pipes, 25, also rise close against the side of the smoke-box and enter the steam-header, $a^8$, at points $25^a$ which are also external to the smoke-box.

The header which comprises the parts, $a^1$ and $a^2$, is divided into at least two water compartments, one communicating with the group of tubes, $a^5$, and the other compartment communicating with the tubes or elements, $a^6$. The purpose of this arrangement is to ensure the passage of the feed-water first through the "combined" elements and then on through the "simple" elements.

In the preferred forms of my headers, there are no pipe joints or unions associated with the heater at any points within the smoke-box. All necessary pipe joints are to be found on the exterior of the smoke-box. Thus, as herein shown, a separable coupling or union is provided in each of the pipes, 16, 17, 22, and 25, care being used to place them in such manner that when uncoupled, no pipe shall interfere with the free removal of the unitary heater or with its replacement in the smoke-box. In my simple gas heater there are but two unions and for the combined heater at most five unions to be coupled and uncoupled at such times.

For the convenient and secure support of the heater, I employ the cross-rails, 26, within the smoke-box. These rest upon suitable brackets, 27, and in turn carry the heater. As hereinafter described, the outer head of the heater, when in position, is fastened to the side of the smoke-box. Thus secured, the heater is firmly held against lurching movement within the smoke-box. If the heater has a blind end (one which does not pass through the opposed side of the smoke-box) it is grasped by yieldable brackets, 28, extending from the side of the smoke-box and assisting to hold the heater firmly but not immovably, in place.

There will be times when all necessary work may be done upon the heater without taking it away from the locomotive; also times when the heater will be withdrawn from the front-end or smoke-box in order that access may be had to the interior thereof for the inspection or repair of the other parts therein, including the flues, the front flue-sheet, and the steam super-heater. Obviously the removal of the heater vacates an opening in the side of the smoke-box, which affords additional means of access to the front end, that may prove more convenient than the customary use of the front-end door. For the support of the heater at times of withdrawal I provide (at the roundhouse) a light metal staging, 29, which may be attached to the outside brackets, 30, upon the smoke-box. This is chiefly composed of rails which form continuations of the rails, 26. In other words, I thus complete a slide-rest for the heater; a permanent portion within the smoke-box and a temporary portion on the exterior thereof. The safe handling of the heater is thus ensured. I prefer that the permanent rails or supports, 26, shall be detachable from the interior brackets, 27, so that they may be removed from the smoke-box at will.

Though not limited thereto, my invention is best embodied in a structure which does not require a modification in the shape of the ordinary locomotive front-end or smoke-box; hence the principal structure herein shown in detail. It will be noticed that none of the parts of my heater extend far enough beyond the contour of the smoke-box to obscure the vision of the engineer and fireman in the locomotive cab. This feature is of distinct value.

As before mentioned, and as clearly shown in the drawings, the body of my heater is made up of a large number of heating elements or tubes of small diameter, placed close together. Ordinarily, I find it possible, as well as best, to make the heating elements from tubing less than an inch in diameter and I am able to place them as close together as a small fraction of an inch. It is only in this way that an adequate total of heating surface can be got into the comparatively small space which is properly available for the purpose within the smoke-box.

This matter of available space within the smoke-box is directly related to the other space which must be preserved therein for the reception and the crushing or breaking up of the cinders before they are permitted to reach the surfaces of the heater.

The close spacing of the heating elements is a matter which is directly related to such pulverization of the cinders, and to reach this result I utilize cinder-breaking parts within the smoke-box; as represented by the table-plate, 3, and a screen or netting, 12, the latter being effectively of a finer mesh than the openings between the heating elements of the heater. Obviously, by thus pre-conditioning the cinders I ensure the freedom of their passage among the closely spaced heating elements and preserve the very desirable self-cleaning function of the front-end, as prescribed by best locomotive practice.

Again, the definite and assured pulverization or conditioning of the cinders in advance of their arrival at the heater, has a definite relation to the close spacing of the heating elements. This arises as follows: As before explained, the front-end gases contain substances (steam, soot, and tarry matters) which tend to condense and lodge and cake upon the heating elements. Such substances if permitted to remain on the tubes would limit or destroy the heating value thereof; and besides that, would quickly build up to the extent of closing the described narrow spaces between the heating elements, thereby impairing the self-cleaning function of the front-end and excluding from the surfaces of the heating elements the hot gases upon which I rely for the heating of the feed-water.

I limit and to a considerable extent prevent, the formation of the sooty coating upon the heating elements by bathing the interior thereof only with initially heated water, as before mentioned and hereinafter more fully explained. But in all cases there must be an added protection and preservation of the external heating surfaces, if the same are to be kept clean, dry, and effective. This added protection is afforded through the agency of the described pulverized cinders, or equivalent substances.

My novel step of pulverizing or conditioning the cinders so that they may pass freely through the heater under the draft from the stack enables such solids to act upon the surfaces of the heater after the manner of a sand-blast and thereby the surfaces are constantly kept clean and at a high point of heating efficiency. Further, except for this reliable scouring and cleaning of the external surfaces of the heater, it would not be possible to keep the passages between the elements open, and at best it would be necessary to space them so widely apart that but few such elements could be accommodated in the front-end and so positioned as to receive the impact of the hot gases.

With reference to the flow of the hot gases, it is to be noted that the tendency thereof under the partial vacuum created at the stack is to gather at the middle of the smoke-box, the gases attempting always to take the shortest path to the exit. The netting or other sizing gage acts as a wide distributor of the pulverized cinders. And notwithstanding the centering tendency of the gases, the minute solid particles picked up at the screen, once started upward, maintain their diverse courses until such time as they impact or strike deflecting surfaces; and thus the showering or blasting of the whole surface of the heater is maintained with certainty. Furthermore, the marked reduction of the temperature and density of the flue gases by the heater, tends to widen the scope of the partial vacuum within the upper part of the smoke-box, upon which the movement of the cinders depends.

I have referred to the problem of keeping soot, etc., from caking on the surfaces of the heater and to that part of my method which pertains to suppressing such action, not alone by the blasting operation but also by keeping all of the surfaces at temperatures which prevent the condensation thereon of vapors within the smoke-box. This temperature step consists in supplying the heater proper with feed-water that is preheated during its passage from the locomotive tender to the heater proper. Most conveniently, and as before mentioned, I employ a steam injector for thus moving the water from the tender to the heater and for raising its temperature before it enters the heater. The temperature that may be imparted to the feed-water in this manner (according to weather conditions and type of injector) averages 160° F. This may be exceeded by employing a high temperature injector. However, the low temperature injector is sufficient and affords a wider range of possible economy. But in either case I maintain surface temperatures which preclude the condensation of moisture upon the heating elements. If moisture is not permitted to condense thereon,—the soot and other substances are easily removed by the described blast of pulverized cinders, or in lieu thereof by a sand-blast applied in any suitable manner.

The steam-operated feed-water injector is included in the combination of parts comprising my best heating equipment, and I regard this preheating element and step as of much practical importance. Nevertheless, the described function of my invention may be performed by apparatus other than an ordinary injector, and my invention is not limited thereto; nor, indeed, does my invention exclude the use of a cold-water pump between the tender and my heater proper. However, it is to be noted that a steam injector or other primary pre-heater should always be used, if for no other reason than to prevent the feeding of cold water to the boiler at times when little or no steam is passing through the engine cylinders or when the gases from the flues are limited in volume or low in temperatures.

I have dwelt at sufficient length upon the vital matters of keeping the heating elements from clogging, both internally and externally, and thus maintaining them at maximum efficiency; and have shown how that phase of my invention admits of the assembly of a large number of the heating elements within the limited space available in the smoke-box and in correct position with respect to the swiftly moving flue gases therein. But there still remains to be further described that comprehensive and desirable feature of my invention without which such spacing and such multiplication of the heating elements in any heater of reasonable size, weight and cost would be ineffective to bring about a high temperature in the feed-water. I here refer to the described novel use of exhaust steam and flue gases as heating mediums in tandem or two-in-one relation. It is this arrangement which primarily explains the relatively small size, weight, and cost of the best form of my heater, and its remarkable capacity, notwithstanding its small size. In this heater I employ only a limited quantity of exhaust steam;—just enough so that the steam, preferably assisted by external hot gases, raises the flowing streams of feedwater substantially to the temperature of the exhaust steam. It is objectionable to go beyond this point in the application of exhaust steam. To do so would be to add to the number of such elements and hence to the cost and weight of the heater, without corresponding increment in the temperature of the feed-water. To obtain such increment I pass the water at substantially exhaust-steam temperature into that further number of simple heating elements which conveniently can be added within the available space, and which expose to the high temperature flue gases an extent of heating surface adequate to the raising of the feed-water to a high terminal temperature before it is discharged into the boiler.

An important incident to my arrangement of steam-heating elements within the smoke-box is that the smoke-box gases take the place of a quantity of insulating material that would be required for the heating elements were they positioned upon the exterior of the boiler. Except for the items of greater cost, insulating material and added weight the exhaust steam portion of my heater may be arranged upon the exterior of the boiler, operatively between the injector or pump and the gas-heated portion of my heater.

I have pointed out the futility of attempting by means of exhaust steam to raise feed-water to a temperature more than slightly in excess of that of the exhaust steam either with or without the simultaneous direct assistance of the flue gases and now call special attention to the fact that beyond this point I secure an important increment of heat in the feed-water only by thereafter subjecting the feed-water to the separate effect of the hot flue gases.

This being understood, I now call attention to a matter which bears upon the over-all efficiency, size, weight and cost of my two-in-one superheater and which arises from the fact that the exhaust steam portion of my heater when fed by an injector is properly of about one-half the size demanded for its use with a cold-water pump.

Persons skilled in the art will immediately understand that my combination of pump and two-in-one heater yields a higher ratio of economy than my combination of injector and heater, but due to the limitations of the smoke-box precludes the attainment of the high terminal temperatures at the water outlet of the heater. Hence both combinations are claimed herein. Yet I prefer and recommend the injector combination because of over-all considerations of comparative efficiency, initial cost, size, weight, up-keep expense and dependability.

Presenting the matter in another light: There is a point at which the pursuit of the highest theoretical economy (based upon the lowest initial feed-water temperature) should be surrendered and attention given to the vital need of a high terminal temperature in the feed-water, which higher temperature has an important relation to the capacity efficiency and convenience of boiler operation and the cost of boiler maintenance.

By my invention I secure this high terminal temperature from the hot flue gases and importantly, I secure it within the confines of a heater that occupies only a small portion of the smoke-box. Briefly, I accomplish this by feeding to large surfaces of the gas-type, water that has already been raised to exhaust steam temperature by a highly efficient heater of the exhaust-steam type, preferably adjacent to a portion of the gas heated surface.

I submit that primarily, my use of exhaust steam and flue gas in the described tandem relation, provides the only way in which the large volume of feed-water required by a locomotive can economically be raised to a high terminal temperature through the agency of a necessarily limited number of heating elements positioned in the smoke-box.

From this standpoint, it may be remarked that with the purpose of securing both economy and high terminal temperature, in measures that more than compensate for the expense of a feed-water heater, I have deliberately employed a heater of the exhaust steam type as a stepping stone from which to attain a high temperature from the flue gases.

I also submit that I am the first in this art to ascertain the inherent limitations of the steam injector, of the exhaust steam heater and of the gas heater as separately and jointly related to the problem of absorbing and conserving in the feed-water that heat which otherwise would be wasted; and, that I am the first to discover the method and, in my preferred apparatus, the first to provide means whereby the individual limitations of these feed-water heaters are converted into advantages and their capacities harmonized by the combination of all three in a single apparatus; bringing into existence a feed-water superheater of sufficiently high capacity and efficiency and of so little weight and cost as to fully warrant, as well as enable, its installation and use upon steam locomotives.

As stated, my invention is not limited to an apparatus of the specific form shown in the drawings, but as I regard the same as the best embodiment thereof, I shall describe in further detail the most advantageous of its structural features, together with their relations to the problem as a whole.

Thus, it is important that the aggregate length of the heating tubes shall be as great as possible, within the limits imposed by the smoke-box shell. Also that variations in the sizes and lengths of the several tubes shall be restricted to the least possible number. Also from a structural stand point, it is highly desirable that each of the tubes shall enter the tube sheets, $a^1$ and $a^3$, upon lines that are perpendicular thereto, this for sake of low cost and security of the joints between the tubes and tube sheets. I accomplished all this, and at the same time accommodate the heater within the general cylindrical outline of the smoke box, by making the tubes straight, by placing the tube sheets perpendicular thereto, and by forming the tube sheets themselves in a series of steps generally conformed to the arched sides of the smoke-box and suited to the several lengths of tubes; each step accommodating a full group thereof. These relations are clearly shown in Figs. 5, 7, 8; wherein the stepped portions of the tube sheets are marked 31. By preference each tube sheet comprises a single plate of steel, so shaped in a power press; and thus it happens that the portions, 31, of each sheet are connected by relatively perpendicular bottom and end portions or webs 32, integral therewith. The outer margin of each tube plate is formed into a flange 33, whereto the respective cap plate is attached by bolts 34, the cap plate having a corresponding margin or flange 35. The cap plates, $a^2$, and, $a^4$, partake of this same stepped form, to the end that they may present the flat portions, 36, perpendicularly to the stay rods or bolts 37. There may be as many as desired of the stay rods. They pass through corresponding tubes of the heater, which tubes are relatively large as needed to receive them and provide the cross sectionally narrow water courses 38. From the stand point of gas heating efficiency, the stay rod containing tubes are comparable with the described steam condensing elements. Obviously these stay bolts, 37, support the caps against the internal pressure to which they are subjected and also tie the opposed heads together. The staybolts are removable as indicated by the threaded nuts, 39, upon the ends thereof. On reference to Figs. 5, 6, and 7, it will be seen how simply this stepped formation of the heads enables the economizer or superheater to be conformed to the general internal shape and dimensions of this smoke box.

Attention is next directed to the flat surfaces upon which each tube sheet receives its cap plate. These plates are indicated by the parting line, 40, of the outer head and the parting line, 41, of the inner head (see Figs. 5 and 6). They are formed by the flanges 33 and 35, which readily submit to a machine-finish, such as a grinding operation; and the joints are made tight by the bolts, 34. Indeed, the machine finishing of these joints may be obviated by using suitable packing material, either metallic or fibrous, between the bolted flanges.

As before stated, the outer header, comprising the parts $a^1$ and $a^2$, is divided into two compartments; one communicating with the group of tubes, $a^5$, and the other receiving the return flow of water from the tubes $a^6$. For clearness, the compartment which receives the feed-water from the injector is here marked 42, and the compartment which receives the water from the tubes $a^6$, is marked 43. The back header, comprising the plates $a^3$ and $a^4$ contains a plurality of spaces, 44, corresponding to the several steps of the tube sheet, but so connected by open passages, 44', as to form an open avenue of communication between the tubes $a^5$ and $a^6$, and which avenue is of an area or capacity corresponding in total, to that of the tubes $a^5$. A distinguishing characteristic of the outer header is that while there is an open passage 43' between the two parts of the chamber, 43, there is no such opening between the chambers or compartments 42 and 43. What would be a communicating passage is closed by forming the tube sheet and cap to meet and make a tight joint on the level of the first horizontal web 32. From this description it will be evident that the cap-plates, $a^2$ and $a^4$, are formed or shaped in different dies. The tube sheets, on the other hand, are substantially symmetrical and, if desired, may be distinguished only by the wider flange, 33, of the sheet, $a^4$; to which further reference will be made.

In connection with the structural characteristics of this device, it should be noted that both the tube sheets and the cap members are of such contour as to permit them to be made wholly of wrought metal by simple press operations. By preference, I employ flat steel plates of about ¼ inch thickness and first heating them, press them to the shapes herein shown. To this end I have purposely designed these parts with generous radius curves and have avoided abrupt angles or surfaces that might be difficult to make by means of simple dies. Those that are skilled in the art will at once recognize the practicability of the described construction and the extremely low cost thereof; however, the rectangular, stepped form of header identified with this heater is not solely a matter of convenience, nor of initial cost, but presents in itself a thoroughly practical construction of maximum strength and minimum weight.

While virtually an integral part of the main header, the exhaust steam compartment or header, $a^8$, thereon is not subject to the same pressure from within; since the exhaust steam seldom carries more than a few pounds pressure per square inch; whereas the pressure within the water compartments of the heater is equal to the boiler pressure, and may exceed 200 lb. per square inch.

By preference a portion of the exhaust steam header, $a^8$, is formed by the upper part of the outside cap, $a^2$. The remainder thereof comprises a pressed or cupped metal sheet, 45, the edges of which may be welded to the plate, $a^2$, as indicated at points, 45′, (see Figs. 5 and 6). The structure of this header is somewhat complicated by the stay bolts which must pass through the same, consisting in the necessity for the through tubes or ferrules, 46, which are welded in plates 45 and $a^2$. The stay bolts 34, of that section are thereby accommodated, obviating the possibility of leaks between the high pressure space 42, and the low pressure space $a^8$.

The exhaust steam header $a^8$, as before indicated, serves as a distributing chamber for exhaust steam. From this chamber the exhaust steam has access to the many small tubular condensing units, $a^7$, which project, as far as needed, into the tubes, $a^5$. These exhaust steam tubes, $a^7$, are closed at thier extremities so that the action of the exhaust steam is to condense in the tubes, relinquishing latent heat to the surrounding feedwater, and to drain back into the header, $a^8$. As a means for supporting the exhaust steam tubes, $a^7$, and holding them horizontal and substantially concentric to the surrounding water tubes, I may employ transverse supports, 47, in the form of rods, welded to the inner walls of the back header. (See Figs. 5, 6 and 10.) Other means might be chosen for supporting the unattached ends of the exhaust steam tubes, but this method is illustrated on account of its extreme simplicity and effectiveness. It is not essential that those tubes be concentric to the water tubes but it is best that they be held as nearly horizontal as possible to avoid a tendency toward trapping either water or air at the closed extremities; which would tend to render them inoperative. However the constant lurching and swaying of the locomotive in motion may be depended upon to correct this situation.

The best source of exhaust steam, as has been previously stated, lies in the exhaust steam passageways, 10, leading from the locomotive cylinders.

The use of more than one exhaust steam supply pipe, 25, to the exhaust steam header, $a^8$, is not essential to my invention but two are better than a single pipe which might be objectionably large. Moreover, the use of two pipes facilitates a separate connection with exhaust steam connections, 25, leading from the right and left hand cylinders of the locomotive. As best shown in Figs. 3 and 6 the exhaust steam pipes 25 enter the ends of the header $a^8$, being disposed within the contour of the front end, as viewed from the cab, 13.

The purpose of the drain pipe 22 leading from the exhaust steam header $a^8$ to the trap 23, is to dispose of the condensed steam which accumulates in the exhaust steam header $a^8$, and the object in intercepting this drain with a steam trap is to prevent the possible waste of exhaust steam through this outlet in advance of condensation. It is estimated that the quantity of exhaust steam required for the operation of this feedwater heater will not exceed ten per cent of the total amount of steam exhausted from the locomotive cylinders. Nevertheless, the return of this quantity of water to the locomotive tender and the incidental conservation of the heat in this quantity of water might prove highly desirable under certain conditions. This is entirely practical and it is within the scope of my invention to connect the pipe 22 to the tender tank, preferably employing an oil separator to remove the oil before the water of condensation reaches the tender tank.

A feature having to do with simplicity of manufacture, as well as convenience of operation, will be found in the wide flange of the outer header. On reference to Figs. 3 and 6 it will be noted that the flange 33, is widened toward the back. To distinguish this extension it is marked 33'. My purpose in employing this extension 33' is to provide an anchorage for the high pressure inlet and outlet connections 16' and 17', and to position them in such manner as to permit the outer header cap $a^2$ to be unbolted and removed without interference with or from those connections. The bent pipes 16' and 17' are welded to the plate 33', as indicated at points 33''. The structure here shown, is further characterized by its small size and light weight. Attention is called to the fact that the high pressure joints in the pipes, 16 and 17 are positioned at one side of the opening through which the heater is withdrawn from the smoke box. The unions or connections in the pipes, 25 and 22, are similarly placed below the opening in the side of the smoke-box. Upon unbolting these connections the heater may be freely withdrawn from the smokebox as well indicated in Fig. 8.

I now call attention to a feature of my invention which is of particular importance; namely, a universal front-end mounting or support for my heaters. I refer to the manner in which I adapt the outer header of my superheater for attachment to the side of any locomotive front-end and at any desired elevation therein. The key-note in the solution of this problem is found in the door-opening frame, 48, which I place in the side of the smoke-box. It will soon be apparent that this frame is of a "universal" order, in so far as by the mere attachment thereof to the side of any smoke-box, I adapt the latter for the reception of the superheater. In brief, I here present a device which makes it unnecessary to shape the outer header of the superheater to the individual form of the smoke-box, and at the same time avoid the use of any part or frame which must needs extend far beyond the side of the smoke-box. In applying the heater to a front-end, I first cut a rectangular hole in the side of the latter, and then fasten the door-frame, 48, in that opening at the particular angle required for co-operation with the extended flange, 33, of the outer header. Having so placed the frame, I then weld the same to the smoke-box shell. The arrangement has the advantage of being leak-proof; preventing leakage of air into the smoke-box, wherein as will be understood a partial vacuum is normally maintained.

The preferred form of the door-frame, 48, is well depicted in Figs. 3, 5, 6, and 8. It is of a recessed or dished formation, comprising the vertical sides, 48', which are perpendicular to the sides of the smoke-box;— the pitched or inclined top and bottom portions, 48''; and, the bottom flange, 48'''. The opening, 49, within the bottom flange, 48''', is of sufficient size to accommodate the back header, which must pass in and out through it. Also it is long enough to accommodate the widened flange, 33', of the outer header with its contained pipe connections, 16' and 17'. Initially, the sides, top and bottom of the door-frame have considerable depth, as indicated by the dotted lines, 48ˣ, in Fig. 8. After cutting the opening in the smoke-box side, I next place the frame 48 therein, with its perpendicular sides substantially in contact with the sides of that opening and then shift the frame 48 from position to position in the opening (this being allowed by the slanting top and bottom portions 48'') until the frame is found to be pitched or inclined at the right angle to receive the outer header flange when the superheater is pushed into the front end. This having been accomplished the extended flange of the outer header bears squarely upon the straight-bottom flange, 48''', of the door-frame. This relation having been attained, the door frame is then welded to the side of the smoke-box, as indicated at points 50. The frame is thereby made integral with the smoke-box shell. Thereafter, the extending edges, (see 48ˣ) of the door-frame are cut away; and thus the door-frame is made to conform to the curvature of the smoke-box. The tight joint between the header and the door-frame is formed by attaching the extended flange 33 of the outer header to the flange, 48''', of the door-frame, as by means of a large number of short bolts, 51. The joint may contain a soft packing if desired, or needed.

It will be apparent that the body of my heater or superheater may be of any desired shape in cross-section, and all such shapes may be accommodated by merely altering the shape of the opening 49 in the door-frame to provide a suitable flange or seat for the header. However, I find that the largest number of water heating elements may be placed within the available space forward of the petticoat pipe, 5, by conforming the body of the heater to generally rectangular boundaries; also that the heating elements may be therein grouped to better advantage than in any circular form. Therefore, not only the door-frame but also the headers and the body of the heater are generally rectangular in form, as well illustrated in Figs. 1 to 4, inclusive.

It would be difficult to overestimate the practical and commercial importance of the described parts which establish the relation between the side of the smoke-box and the body of the superheater. On consideration, it will be found that the structure as a whole is of comparatively light weight, of great strength, of low cost, and is substantially "universal" in adaptation to front-ends of different dimensions. Indeed, through the use of this simple structure it becomes practical to apply the superheater through the side of the front-end or smoke-box and have its outer end exposed therethrough. Otherwise there would be need for extremely disadvantageous and heavy parts, specially shaped to fit the smoke-box as well as the heater proper, and extending far beyond the side of the smoke-box, with obvious detriment to the vision of the engine men. Also from a practical standpoint, it should be noted that, by preference, in applying these superheaters I disturb only one side of the front-end, and have no obstructions whatever upon the engineer's or driver's side of the locomotive.

When the heater has been fastened in place the outer header thereof may be advantageously "lagged", or covered with insulating material, and yet not extend out far enough to obscure the roadway ahead.

In providing a feed-water heater that is economically sound and practically workable I have promoted its low first cost by virtue of standardization of application to a wide range of locomotive types and have provided for unlimited interchangeability for the unitary heater. It should be noted that described interchangeability is of the utmost importance because it enables a railroad company to carry a minimum number of spare parts or units for replacement purposes and simplifies many troublesome and expensive details incident to manufacturing a device of this character.

Figs. 10, 12 and 13, show how both the simple tubes, $a^6$, and the outer casing of the combination tubes, $a^5$, are inserted and expanded into, or welded to, the tube sheets $a'$ and $a^3$, in conformity with the best boiler practice. The exhaust steam tubes, $a^7$, with closed-in ends and which extend from the exhaust steam header, $a^8$, into the tubes, $a^5$, are inserted in or welded, to the cap-plate, $a^2$, of the outer header.

The perfect freedom with which the interior header may respond to expansion or contraction enables the use of straight tubular elements, as shown. The advantages of straight tubes both from a structural and a maintenance standpoint is obvious. Structurally, the apparatus is lighter, stronger and more easily assembled; in fact, no other form of construction can be made as rugged without an appreciable increase in weight. From the standpoint of maintenance, there can be no question as to the great advantage of having straight tubes which are accessible for cleaning from either end.

The arrangement of tubular members as shown in Figs. 3, 5, 6, 7 and 8 is perfectly adapted to subjecting feed-water to the heat of exhaust steam and hot gases, in tandem as has been described, and accomplishes certain other objectives of considerable importance from both maintenance and operation standpoints. In the first place, the violence of expansion and contraction is minimized by so proportioning the tubular structure of my invention so that the quantity of water in relation to the surrounding metal is relatively less where the temperature of the water is lowest and relatively greater in the base of the heater where the difference in temperature between the feed-water and surrounding structure is at a minimum.

The removal of the cap of the outer header serves at once to give access to the interior of the header and to one extremity of all the water tubes for cleaning purposes. Since the exhaust steam tubes, $a^7$, are secured to the outer cap of this header, its removal also serves to withdraw those tubes from the water tubes, $a^5$, shown in Fig. 9. From this, it will be apparent that by the simple operation of removing the nuts from the end of the staybolts, 37, and the bolts which secure the cap plate, $a^2$, to the tube sheet, $a'$, the cap plate may be removed and a very large portion of the interior surfaces may be immediately reached for the purpose of cleaning them. The operation may be further completed by detaching the outer header from the frame, 48, and after disconnecting the piping, drawing the entire apparatus from the smokebox. Thereafter the cap plate $a^4$, may be removed from the tube sheet, $a^3$, of the inner header. Thus every water tube is made accessible from both ends, and also the internal surfaces of both headers are made accessible.

It is not often, however, that it will be necessary to dismember the apparatus to the extent next above described in order to keep it free from dirt and scale. Indeed cleaning tools are used upon the internal surfaces at remote intervals; and then only when the feedwater used is highly charged with hard scale forming impurities. As will be observed, I have made provision for violently reversing the flow of water throughout every part of the heater and discharging into the atmosphere the accumulated impurities together with a small proportion of boiler water. Such cleansing action, if systematically undertaken and occasionally supplemented by removing the cap plate of the outer header, in the manner described, which permits the cleaning each tube by mechanical means common to boiler practice, is sufficient to maintain the heater in a clean and efficient condition. Too great emphasis cannot be laid upon this feature of my invention, nor upon the fact that this cleaning process is greatly facilitated by virtue of the fact that all of the tubular elements are straight. A very slight coating of scale upon the interior surfaces reduces the heat absorbing capacity of the surfaces and an accumulation of such scale soon renders a device of this character inoperative. Inability to maintain the interior surfaces of heaters of this class in a clean condition is a common defect responsible for the practical failure of locomotive feed-water heaters of a tubular type. To further facilitate cleaning this feed-water heater without dismembering or even removing the heater from the locomotive smoke-box, several washout plugs, 52, are provided in both the outer and inner headers.

The design of this feed-water heater is such that the velocity of the feed-water through one group of tubes is entirely independent of its velocity in other parts of the heater; which condition may be taken advantage of in bad water districts to increase the velocity of the water through the lower tubes as a means for preventing the deposition of scale induced by the higher temperatures to which the base of the heater is subjected.

This flexibility of feed-water velocity is subject to control either by the cross-sectional area of the tubular-passage-ways or by the supplemental partitioning of the header. Thus in the preferred form, shown in Figs. 1 to 8, inclusive, I first direct the feed-water through the combination tubes, $a^5$, wherein the area of the water-passageway is equal to the aggregate interior cross-sectional area of all the water tubes in this bank, less the total cross-sectional area of stay-bolts, 37, and the exhaust steam tubes, $a^7$. While this is preferably made greater than the area of the branch pipe, 16, and intake connection, 16′, still it is very much less than the aggregate internal area of the two lower banks of simple tubes, $a^5$, through which I return the feed-water to the main header; and, consequently, the velocity in the simple tubes is very much less than in the combined tubes. This condition, however, can be modified by placing supplemental partitions, 53, in the headers as shown in Fig. 11. The same results may also be accomplished by altering the stepped contour of the tube sheets, and cap-members of both headers as shown in Fig. 14, so that these sheets will co-act to form or create the necessary partitions. In the heaters shown in both Figs. 11 and 14 the feed-water is required to execute four passes between the headers and with the design of Fig. 11 it is purposed to induce a higher velocity in the simple base tubes than in the combination top-tubes despite the contracted cross-sectional area of the combination tubes occasioned by the presence of exhaust steam tubes, $a^7$.

I now offer the following explanation with respect to the sizing and positioning of the tubular elements in relation to gas-flow in the smoke-box. As most clearly shown in Fig. 4, the horizontal spacing between adjacent tubes is not constant, but commencing with the minimum width of spacing between adjacent surfaces in the lowest bank of tubes, increases with the height until the maximum spacing is attained in the highest bank of tubes. The object of this arrangement is to diminish the frictional resistance to the gas-entrained solid particles as these are drawn up through the heater and is regarded as an excellent provision, since the velocity of these solid particles must otherwise diminish on account of successive collisions with closely spaced tubes and might even result in stopping the solid particles if the retarding influence of the tubes is not compensated for in the spacing thereof.

Closely related to this phase of the operation of my invention is the function of the front-end netting or cinder-screen, 12, which is depended upon to condition all gas-entrained solid particles to a size that will admit of their free passage between any two adjacent tubes in the heater structure. Consequently, as before stated, the meshes of this screen or netting 12 are slightly less in size than the minimum spacing between the bottom tubes of the heater. It has been stated that the ordinary front-end netting will answer admirably as a means for conditioning the solid particles. I, therefore, have depicted this form of a cinder-screen, 12, in all my drawings. It will be noted that the only deviation from the usual practice involved is a change in the angularity of the netting which usually rises from the table-plate, 3, to the crest of the smoke-box at an even inclination but in this case I find it advantageous to bring the netting forward at a low angle in order to clear the base of my heater before rising to the crest of the smoke-box. This in itself, however, is an advantage since the netting is thus more abruptly opposed to the flow of gas and entrained cinder-particles. Moreover, the surface area of the netting is thereby slightly increased; which is an advantage. Between the above described front-end netting, 12, and the heater proper the cross rails, 26, and supporting brackets, 27, are located; as shown in Figs. 3, 5, 6, 7 and 8. These are intended primarily as supports for the body of the heater, both in position and in process of insertion or removal from the locomotive smoke-box. I have shown but two removable cross rails and this should be the minimum, and the number may be multiplied and the individual size reduced to the extent of providing, in effect, a shield or grating adapted to break the force of the initial cinder blows and abrading action upon the lower tubes of the heater.

Figs. 15 and 16 represent extreme modifications in the relative proportion of simple and combination tubes employed and are largely symbolic of the flexibility of my invention with respect to meeting extreme conditions, as under all ordinary circumstances the cumulative heat effect of exhaust steam and waste gas absorbed in series leads to the best results. Fig. 15 in which only simple tubes are used, serves to demonstrate the adaptability of this feed-water heater to a condition where the feed-water is initially received at a high temperature, and Fig. 16 showing all elements containing condensing tubes, serves to show its adaptability to feed-water at an abnormally low temperature and in great volume, which would necessitate the use of a considerable quantity of exhaust steam to effect an increase in temperature to that of the exhaust steam. Moreover my invention contemplates the use of a unit heater as shown in Fig. 15 in series with a unit heater as shown in Fig. 16 under condition which would make such an arrangement desirable, as is wholly possible with many locomotives having an extended smoke-box. Fig. 17 differs from Fig. 4, in the arrangement of the combined and simple tubes.

Having thus described my invention, I claim as new and desire to secure by Letters Patent:

1. A locomotive boiler and front-end with the conventional arrangement of diaphragm, exhaust nozzle, cinder screen and stack for the continuous discharge of hot gases, vapors and cinders, in combination with a feed-water superheater, through which the boiler is fed; said superheater being composed of many closely spaced water-tubes exposed within, and together occupying substantially all of, the conventional space between said screen and the blast from said nozzle; said screen converting the front-end cinders into a blast of scouring particles that pass between the closely spaced tubes and keep them clean; primary water-feeding-and-heating means positioned upon the exterior of the boiler and supplying the superheater with feed-water at temperatures that suppress the condensation of front-end vapors thereon; and, means enabling the removal of solids from the interior of the superheater.

2. A locomotive boiler and front-end with the conventional arrangement of diaphragm, exhaust nozzle, cinder screen and stack for the continuous discharge of hot gases, vapors and cinders, in combination with a feed-water superheater, through which the boiler is fed; said superheater being composed of many closely spaced water-tubes exposed within, and together occupying substantially all of, the conventional space between said screen and the blast from said nozzle; said screen converting the front-end cinders into a blast of scouring particles that pass between the closely spaced tubes and keep them clean; primary water-feeding-and-heating means positioned upon the exterior of the boiler and supplying the superheater with feed-water at temperatures that suppress the condensation of front-end vapors thereon; and, means for reversing, at will, the water flow through said tubes and discharging water and sediment therefrom under boiler pressure.

3. A locomotive boiler and front-end with the conventional arrangement of diaphragm, exhaust nozzle, cinder screen and stack for the continuous discharge of hot gases, vapors and cinders, in combination with a multiple-water-tube feed-water superheater through which the boiler is fed, the tubes of said superheater being each exposed to the hot gases within, and together occupying substantially all of the conventional space between said screen and nozzle, primary water-feeding-and heating means which supply the superheater with feed-water at temperatures that prevent the condensation of vapors upon its tubes, said screen serving to convert the cinders into a continuous blast of scouring particles that pass between and keep said tubes clean, and means permitting said tubes to be cleaned internally without removal from the front-end.

4. A locomotive boiler and front-end with the conventional arrangement of diaphragm, exhaust nozzle, cinder screen and stack for the continuous discharge of hot gases, vapors and cinders, in combination with a multiple-water-tube feed-water superheater through which the boiler is fed, said superheater being exposed to the hot gases within, and occupying substantially all of the conventional space between said screen and nozzle; primary water-feeding-and-heating means which supply the superheater with feed-water at temperatures that prevent the condensation of vapors upon the gas exposed surfaces thereof and said screen serving to convert the cinders into a continuous blast of scouring particles that keep said surfaces clean; means for blowing sediment from the superheater under boiler pressure; and, means permitting the superheater tubes to be mechanically de-scaled without removing the superheater from the front-end.

5. A locomotive boiler and front-end with the conventional arrangement of diaphragm, exhaust nozzle, cinder screen and stack for the continuous discharge of hot gases, vapors and cinders, in combination with a feed-water superheater through which the boiler is fed, said superheater being exposed to the hot gases within, and occupying substantially all of, the conventional space between said screen and nozzle; primary water-feeding-and-heating means which supply the superheater with feed-water at temperatures that prevent the condensation of vapors upon the gas exposed surfaces thereof and said screen serving to convert the cinders into a continuous blast of scouring particles that keep said surfaces clean, and means enabling the removal of solids from the superheater without change in the described position thereof.

6. A locomotive boiler and front-end with the conventional arrangement of diaphragm, exhaust nozzle, cinder screen and stack, for the continuous discharge of hot gases, vapors and cinders, in combination with a multiple-water-tube feed-water superheater through which the boiler is fed, said superheater being exposed to the hot gases within, and occupying substantially all of the conventional space between said screen and nozzle, said screen serving to convert the cinders into small scouring particles that continuously blast the exposed surfaces of the superheater and keep them clean, primary water-feeding-and-heating means which supply the superheater with feed-water at the rate required by the boiler and at temperatures that prevent the condensation of vapors upon such cleaned surfaces of the superheater, and the water inlet and outlet connections of said superheater being upon the exterior of said front-end and the superheater, upon disconnection, being withdrawable as a unit without disturbing the other parts of said front-end.

7. A locomotive boiler and front-end with the conventional arrangement of diaphragm, exhaust nozzle, cinder screen and stack, for the continuous discharge of hot gases, vapors and cinders, in combination with a multiple-water-tube feed-water superheater in said front-end and through which the boiler is fed, said superheater occupying only the conventional space between said screen and nozzle and being therein exposed to the flow of hot gases, said screen serving to convert the cinders into a continuous blast of scouring particles that keep the gas exposed surfaces of the superheater clean, primary water-feeding-and-heating means which supply the superheater with feed-water at the rate required by the boiler and at temperatures that prevent the condensation of vapors upon the cleaned surfaces of the superheater, means for blowing sediment from the superheater under boiler pressure; the water inlet and outlet connections of said superheater being upon the exterior of said front-end and the superheater, upon disconnection, being withdrawable as a unit without disturbing the other parts of said front-end, and said superheater having an outer end adapted to be opened on the exterior of the front end and through which the interior of the superheater may be cleaned without withdrawing it from the front-end.

8. A locomotive boiler and front-end with the conventional arrangement of diaphragm, exhaust nozzle, cinder screen and stack, in combination with a multiple-water-tube feed-water superheater through which the boiler is fed, the tubes of said superheater extending transversely across said front-end within the conventional space between said screen and nozzle and hence positioned to receive the perpendicular impact of the hot gases and cinders, said screen serving to convert the cinders into small scouring particles that continuously blast the surfaces of the superheater and keep them clean, primary water-feeding-and-heating means which supply the superheater with feed-water at the rate required by the boiler and at temperatures that prevent the condensation of vapors upon such cleaned surfaces, one end of said superheater being exposed through, but tightly jointed to, the side wall of the front-end and being there provided with a removable closure means, the removal of which permits access to the interior of the superheater.

9. A locomotive boiler and front-end with the conventional arrangement of diaphragm, exhaust nozzle, cinder screen and stack, for the continuous discharge of hot gases, vapors and cinders, in combination with a multiple-water-tube feed-water superheater through which the boiler is fed, said superheater being exposed to the hot gases within the conventional space between said screen and nozzle, said screen serving to convert the cinders into a continuous blast of scouring particles that keep the exposed surfaces of the superheater clean, primary water-feeding-and-heating means which supply the superheater with feed-water at the rate required by the boiler and at temperatures that prevent the condensation of vapors upon the cleaned surfaces of the superheater, an exhaust steam condenser occupying the interior of said superheater and assisting in the heating of the feed-water therein, and means facilitating the removal of scale and sediment from the interior of the superheater.

10. A locomotive boiler and front-end with the conventional arrangement of diaphragm, exhaust nozzle, cinder screen and stack, for the continuous discharge of hot gases, vapors and cinders, in combination with a multiple-water-tube feed-water superheater through which the boiler is fed, said superheater being exposed to the hot gases within the conventional space between said screen and nozzle, said screen serving to convert the cinders into a continuous blast of scouring particles that keep the exposed surfaces of the superheater clean, primary water-feeding-and-heating means which supply the superheater with feed-water at the rate required by the boiler and at temperatures that prevent the condensation of vapors upon the cleaned surfaces of the superheater, an exhaust steam condenser occupying the entrance portion of the interior of said superheater and assisting in the further heating of the feed-water therein and means facilitating the removal of scale and sediment from the interior of the superheater.

11. A locomotive boiler and front-end with the conventional arrangement of diaphragm, exhaust nozzle, cinder screen and stack, for the continuous discharge of hot gases, vapors and cinders, in combination with a multiple-water-tube feed-water superheater through which the boiler is fed, said superheater being exposed to the hot gases within the conventional space between said screen and nozzle, said screen serving to convert the cinders into a continuous blast of scouring particles that keep the exposed surfaces of the superheater clean, primary water-feeding-and-heating means which supply the superheater with feed-water at the rate required by the boiler and at initial temperatures that prevent the condensation of vapors upon the superheater, an exhaust steam condenser positioned within the tubes of said superheater and assisting in the heating of the feed-water supplied thereto, and means admitting of the removal of scale and sediment from the interior of the superheater without disconnecting the same or removing it from the front-end.

12. A locomotive boiler and front-end with the conventional arrangement of diaphragm, exhaust nozzle, cinder screen and stack, for the continuous discharge of hot gases, vapors and cinders, in combination with a multiple-water-tube feed-water superheater through which the boiler is fed, said superheater being exposed to the hot gases within the conventional space between said screen and nozzle, said screen serving to convert the cinders into a continuous blast of scouring particles that keep the exposed surfaces of the superheater clean, primary water - feeding - and - heating means which supply the superheater with feed-water at the rate required by the boiler and at initial temperatures that prevent the condensation of vapors upon the superheater, an exhaust steam condenser occupying the interior of said superheater and assisting in the heating of the feed-water therein, means for discharging sediment from the superheater under boiler pressure and said condenser being withdrawable from said superheater without change in the position of the latter.

13. A locomotive boiler with its firebox, flues and conventional front-end, in combination with a multiple-water-tube feed-water superheater through which the boiler is fed, said superheater being positioned wholly within said front-end to absorb heat from the flue gases, primary water-feeding-and-heating means which supply the superheater with feed-water at the rate required by the boiler and at temperatures that prevent the condensation of vapors upon the gas exposed surfaces of the superheater, an exhaust steam condenser occupying a part of the interior of said superheater to heat the water flowing therethrough, and means facilitating the removal of scale and sediment from the water-courses of the superheater.

14. A locomotive boiler with its firebox, flues and front-end, in combination with a multiple-water-tube feed-water superheater through which the boiler is fed, said superheater being positioned within said front-end to absorb heat from the flue gases, primary water - feeding - and - heating means which supply the superheater with feed-water at the rate required by the boiler and at temperatures that prevent the condensation of vapors upon the gas exposed surfaces of the superheater, an exhaust steam condenser occupying a portion of the interior of said superheater to heat the water flowing therethrough, one end of said superheater penetrating one wall of said front-end, and said condenser being withdrawable as a whole from that end of the superheater.

15. A locomotive boiler with its firebox, flues and front-end, in combination with a multiple-water-tube feed-water superheater through which the boiler is fed, said superheater being positioned within said front-end to absorb heat from the flue gases, primary water - feeding - and - heating means which supply the superheater with feed-water at the rate required by the boiler and at temperatures that prevent the condensation of vapors upon the gas exposed surfaces of the superheater, an exhaust steam condenser occupying a portion of the interior of said superheater to heat the water flowing therethrough, means for discharging sediment from the water courses of the superheater under boiler pressure, one end of said superheater penetrating the wall of said front-end and said condenser being withdrawable as a whole from that end of the superheater.

16. A locomotive boiler with its internal firebox, flues and conventional front-end, in combination with a multiple-water-tube feed-water superheater through which the boiler is fed, said superheater being positioned within said front-end to absorb heat from the flue gases, water-feeding means which supply the superheater with feedwater, an exhaust steam condenser occupying a portion of the interior of said superheater to heat the water flowing therethrough, one end of said superheater and condenser being exposed through but tightly sealed in one wall of said front-end and the inlet and outlet connections of said superheater and condenser being arranged upon such exposed end and hence accessible from the exterior of the front-end.

17. A locomotive boiler and front-end with the conventional diaphragm, exhaust nozzle, cinder-screen and stack for the continuous discharge of hot gases, vapors and cinders, said front-end having an opening in its side leading into the conventional transverse space between said screen and nozzle, in combination with a feed-water superheater occupying said space, said superheater comprising two water headers and groups of water tubes connecting them and exposed to the gases, vapors and cinders passing through said space toward the stack, said screen serving to convert the cinders into a blast of small particles which pass between and constantly scour said tubes, one of said headers containing the water inlet and the water outlet of the superheater, said header being lodged in and externally exposed through said opening in the side of the front-end, said outlet being joined to the boiler through a connection on the exterior of the front-end, a source of feed-water, said source being joined to said inlet by a connection also on the exterior of the front-end, primary water-feeding-and-heating means embraced in the connection between said source and said inlet and adapted to supply feed-water to the superheater at temperatures that prevent the condensation of vapors upon the gas exposed surfaces thereof, means for momentarily opening the connection adjacent said inlet to blow water and sediment from the superheater under boiler pressure, the externally exposed header of the superheater having a removable end adapted to afford cleaning access to the interior of the superheater without disturbing the latter or its water connections, an exhaust steam header upon said removable end, closed-end steam condensing tubes extending from said steam header into respective water tubes of the group adjacent said water inlet of the superheater, a suitably trapped condensate drain for said exhaust steam header, and said superheater, upon being unjoined from its water and steam connections, being withdrawable endwise from said space and opening, without dismemberment and without otherwise opening the front-end or disturbing the other parts therein.

18. A locomotive boiler and front-end with the conventional diaphragm, exhaust nozzle, cinder-screen and stack for the continuous discharge of hot gases, vapors and cinders, said front-end having an opening in its side leading into the conventional transverse space between said screen and nozzle, in combination with a feed-water superheater occupying said space and through which the boiler is fed, said superheater comprising two water headers and water tubes connecting them and exposed to the gases, vapors and cinders passing through said space toward the stack, said screen serving to convert the cinders into a blast of small particles which pass between and constantly scour said tubes, one of said headers being lodged in and externally exposed through said opening in the side of the front-end, a source of feed-water in connection with said superheater, primary water-feeding-and-heating means embraced in the feed-water connection and adapted to supply feed-water to the superheater at temperatures that prevent the condensation of vapors upon the gas exposed surfaces thereof, means for momentarily opening said connection adjacent the superheater to blow water and sediment therefrom under boiler pressure, the externally exposed header of the superheater having a removable end adapted to afford cleaning access to the interior of the superheater without disturbing the same or its water connections, an exhaust steam header upon said removable end, steam condensing tubes extending from said steam header into respective water tubes of the superheater, a suitably trapped condensate drain for said exhaust steam header, and said superheater, with the contained condenser, being withdrawable endwise from said space and opening, without dismemberment and without otherwise opening the front-end or disturbing the other parts therein.

19. A locomotive boiler and front-end with the conventional diaphragm, exhaust nozzle, cinder-screen and stack for the continuous discharge of hot gases, vapors and cinders, said front-end having an opening in its side leading into the conventional transverse space between said screen and nozzle, in combination with a feed-water superheater occupying said space, said superheater comprising two water headers and groups of water tubes connecting them and exposed to the gases, vapors and cinders passing through said space toward the stack, said screen serving to convert the cinders into a blast of small particles which pass between and constantly scour said tubes, one of said headers containing the water inlet and the water outlet of the superheater, said header being lodged in and externally exposed through said opening in the side of the front-end, said outlet being joined to the boiler through a connection on the exterior of the front-end, a source of feed-water, said source being joined to said inlet by a connection also on the exterior of the front-end, primary water-feeding-and-heating means embraced in the connection between said source and said inlet and adapted to supply feed-water to the superheater at temperatures that prevent the condensation of vapors upon the gas exposed surfaces thereof, means for momentarily opening the connection adjacent said inlet to blow water and sediment from the superheater under boiler pressure, the externally exposed header of the superheater having a removable end adapted to afford cleaning access to the interior of the superheater without disturbing the latter or its water connections, and said superheater, upon being unjoined from said connections, being withdrawable endwise from said transverse space and opening, without dismemberment and without otherwise opening the front-end or disturbing the other parts therein.

20. A locomotive boiler and front-end with the conventional diaphragm, exhaust nozzle, cinder-screen and stack for the continuous discharge of hot gases, vapors and cinders, said front-end having an opening in its side leading into the conventional transverse space between said screen and nozzle, in combination with a feed-water superheater occupying said space and through which the boiler is fed, said superheater comprising two water headers and water tubes connecting them and exposed to the gases, vapors and cinders passing through said space toward the stack, said screen serving to convert the cinders into a blast of small particles which pass between and constantly scour said tubes, one of said headers being lodged in and externally exposed through said opening in the side of the front-end, a source of feed-water in connection with said superheater, primary water-feeding-and-heating means embraced in the feed-water connection and adapted to supply feed-water to the superheater at temperatures that prevent the condensation of vapors upon the gas exposed surfaces thereof, means for momentarily opening the connection adjacent the superheater to blow water and sediment therefrom under boiler pressure, the externally exposed header of the superheater having a removable end adapted to afford cleaning access to the interior of the superheater without disturbing the latter or its water connections, and said superheater, upon the disconnection of its water connections, being withdrawable endwise from said transverse space and opening, without dismemberment and without otherwise opening the front-end or disturbing the other parts therein.

21. A locomotive boiler and front-end with the conventional exhaust nozzle, and stack, said front-end having an opening in its side leading into the conventional space forward of said nozzle, in combination with a feed-water superheater occupying said space, said superheater comprising two water headers and groups of water tubes connecting them and exposed to the gases passing through said space toward the stack, one of said headers containing the water inlet and the water outlet of the superheater, said header being lodged in and externally exposed through said opening in the side of the front-end, said outlet being joined to the boiler through a connection on the exterior of the front-end, a source of feed-water, said source being joined to said inlet by a connection also on the exterior of the front-end, primary water-feeding-and-heating means embraced in the connection between said source and said inlet and adapted to supply feed-water to the superheater against boiler pressure, means upon the externally exposed header of the superheater adapted to afford cleaning access to the interior of the superheater without disturbing the position of the latter or its water connections, an exhaust steam header upon said exposed header, steam condensing tubes extending from said steam header into respective water tubes of the group adjacent said water inlet of the superheater, a suitably trapped condensate drain for said exhaust steam header, and said superheater upon being unjoined from its water and steam connections, being withdrawable endwise from said space and opening, without dismemberment and without otherwise opening the front-end or disturbing the other parts therein.

22. A locomotive boiler and front-end with the conventional exhaust nozzle and stack, said front-end having an opening in its side leading into the conventional space forward of said nozzle, in combination with a feed-water superheater occupying said space, said superheater comprising two water headers and water tubes connecting them and exposed to the gases passing through said space toward the stack, one of said headers containing the water inlet and the water outlet of the superheater, said header being lodged in and externally exposed through said opening in the side of the front-end, said outlet being joined to the boiler through a connection on the exterior of the front-end, a source of feed-water, said source being joined to said inlet by a connection also on the exterior of the front-end, primary water-feeding-and-heating means embraced in the connection between said source and said inlet and adapted to supply feed-water to the superheater against boiler pressure, means upon the externally exposed header of the superheater adapted to afford cleaning access to the interior of the superheater without disturbing the position of the latter or its water connections, and said superheater, upon being unjoined from said connections, being withdrawable endwise from said transverse space and opening, without dismemberment and without otherwise opening the front-end or disturbing the other parts therein.

23. A locomotive boiler and front-end with the conventional exhaust nozzle and stack for the continuous discharge of the hot flue gases, said front-end having an opening in its side leading into the conventional transverse space forward of said nozzle, in combination with a feed-water superheater occupying said space and comprising two water headers and groups of water tubes connecting them and exposed to the gases passing through said space toward the stack, one of said headers containing the water inlet and the water outlet of the superheater, said header being lodged in and externally exposed through said opening in the side of the front-end, said outlet being joined to the boiler through a connection on the exterior of the front-end, a source of feed-water, said source being joined to said inlet by a connection also on the exterior of the front-end, primary water-feeding-and-heating means embraced in the connection between said source and said inlet and adapted to supply feed-water to the superheater against boiler pressure, means for momentarily opening the connection adjacent said inlet to blow water and sediment from the superheater under boiler pressure, and said superheater, upon being unjoined from said connections, being withdrawable endwise from said transverse space and opening, without dismemberment and without otherwise opening the front-end or disturbing the other parts therein.

24. A locomotive boiler and front-end with the conventional exhaust nozzle, and stack for the continuous discharge of the hot flue gases, said front-end having an opening in its side leading into the conventional transverse space forward of said nozzle, in combination with a feed-water superheater occupying said space, said superheater comprising two water headers and groups of water tubes connecting them and exposed to the gases passing through said space toward the stack, one only of said headers containing the water inlet and the water outlet of the superheater, said only header being lodged in and externally exposed through said opening in the side of the front-end, a source of feed-water, primary water-feeding-and-heating means embraced in a connection between said source and boiler, which connection also includes said superheater, the externally exposed header of the superheater having removable closure means adapted to afford cleaning access to the interior of the superheater without disturbing the latter or its water connections, and said superheater, upon being unjoined from its connections, being withdrawable endwise from said space and opening, without dismemberment and without otherwise opening the front-end or disturbing the other parts therein.

25. A locomotive boiler and front-end with the conventional exhaust nozzle and stack for the continuous discharge of the hot flue gases, said front-end having an opening in its side leading into the conventional transverse space forward of said nozzle, in combination with a feed-water superheater occupying said space, said superheater comprising two water headers and groups of water tubes connecting them and exposed to the gases passing through said space toward the stack, one of said headers being lodged in and externally exposed through said opening in the side of the front-end, a source of feed-water, primary water-feeding-and-heating means embraced in the connection between said source and boiler, which connection also includes the superheater, and the externally exposed header of the superheater having a removable end adapted to afford cleaning access to the interior of the superheater without disturbing the latter or its water connections, an exhaust steam header upon said removable end, steam condensing tubes extending from said steam header into respective water tubes of the group adjacent the water inlet of the superheater, and a suitably trapped condensate drain for said exhaust steam header.

26. A locomotive boiler and front-end with the conventional diaphragm, exhaust nozzle and stack, said front-end having an opening in its side leading into the conventional transverse space forward of said nozzle, in combination with a feed-water superheater occupying said space, said superheater comprising two water headers and water tubes connecting them and exposed to the gases passing through said space toward the stack, one of said headers containing the water inlet and the water outlet of the superheater, said header being lodged in and externally exposed through said opening in the side of the front-end, said outlet being joined to the boiler through a connection on the exterior of the front-end, a source of feed-water, said source being joined to said inlet by a connection also on the exterior of the front-end, primary water-feeding-and-heating means embraced in the connection between said source and said inlet and adapted to supply feed-water to the superheater, and the externally exposed header of the superheater having a removable end adapted to afford cleaning access to the interior of the superheater without disturbing the latter or its water connections.

27. A locomotive boiler and front-end with the conventional diaphragm, exhaust nozzle and stack, said front-end having an opening in its side leading into the conventional transverse space forward of said nozzle, in combination with a feed-water superheater occupying said space, said superheater comprising two water headers and water tubes connecting them and exposed to the gases passing through said space toward the stack, one of said headers containing the water inlet and the water outlet of the superheater, said header being lodged in and externally exposed through said opening in the side of the front-end, said outlet being joined to the boiler through a connection on the exterior of the front-end, a source of feed-water, said source being joined to said inlet by a connection also on the exterior of the front-end, primary water-feeding-and-heating means embraced in the connection between said source and said inlet and adapted to supply feed-water to the superheater against boiler pressure, means for momentarily opening the connection adjacent said inlet to blow water and sediment from the superheater under boiler pressure, and the externally exposed header of the superheater having a removable end adapted to afford cleaning access to the interior of the superheater without disturbing the latter or its water connections.

28. A locomotive boiler and front-end with the conventional exhaust nozzle and stack for the continuous discharge of the hot flue gases, said front-end having an opening in its side leading into the conventional transverse space forward of said nozzle, in combination with a feed-water superheater occupying said space, said superheater comprising two water headers and groups of water tubes connecting them and exposed to the flue gases passing through said space toward the stack, one said header being lodged in and externally exposed through said opening in the side of the front-end, a source of feed-water, primary water-feeding-and-heating means embraced in a connection between said source and boiler, which connection also includes said superheater, means for momentarily opening the connection between the superheater and feeder to blow water and sediment from the superheater under boiler pressure, the externally exposed header of the superheater having a removable end adapted to afford cleaning access to the interior of the superheater without disturbing the latter or its water connections.

29. A locomotive cab, boiler and front-end with the conventional diaphragm, exhaust nozzle and stack, said front-end having an opening in its side leading into the conventional transverse space forward of said nozzle, in combination with an elongated feed-water heater exposed to the hot gases within said space, one end of said heater containing both its water inlet and its water outlet and being externally exposed through said opening in the side of the front-end, said outlet being in communication with the boiler through a connection on the exterior of the front-end, water feeding means joined to said inlet by a connection also on said exterior and containing an interposed back-check valve, and a blow-off valve operable from said cab for momentarily opening the last-mentioned connection at a point between said check valve and said inlet to discharge water and sediment from said heater under boiler pressure.

30. A locomotive cab, boiler and front-end with the conventional diaphragm, exhaust nozzle and stack, said front-end having an opening in its side leading into the conventional transverse space forward of said nozzle, in combination with an elongated feed-water heater exposed to the hot gases within said space, one end of said heater containing both its water inlet and its water outlet and being externally exposed through said opening in the side of the front-end, said outlet being in communication with the boiler through a connection on the exterior of the front-end, water feeding means joined to said inlet by a connection also on said exterior and containing an interposed back-check valve, a blow-off valve operable from said cab for momentarily opening the last-mentioned connection at a point between said check valve and said inlet to discharge water and sediment from said heater under boiler pressure, and means upon the exposed end of the heater permitting cleaning access to the interior of the heater when free from boiler pressure.

31. A locomotive boiler and front-end, in combination with a multiple-water-tube feed-water superheater positioned in said front-end and through which the boiler is fed, an exhaust steam condenser inside of said superheater, water feeding means connected with the superheater to supply the same with feed-water against boiler pressure, and means for momentarily opening the supply connection of the superheater to the atmosphere, to dislodge and discharge sediment from its tubes under boiler pressure.

32. A locomotive boiler having a smokebox of conventional form but provided with a relatively small opening in one of its upright walls for the reception of a feed-water heater, in combination with a feed-water heater comprising a body of water tubes extending through said opening and into the path of the hot gases within said smokebox, means closing said opening while leaving the ends of the water tubes accessible from the exterior of the smokebox for purposes of cleaning and said body of tubes being withdrawable through said opening without opening said heater or said smokebox.

33. A locomotive boiler having a smokebox of conventional form but provided with a relatively small opening in one side for the reception of a feed-water heater, in combination with a feed-water heater comprising suitable headers and a body of water tubes extending through said opening and across the path of the hot gases within said smokebox, means tightly closing said opening, water connections at the end of said heater upon the exterior of the smokebox, and said heater being withdrawable intact through said opening without otherwise opening said smokebox.

34. A locomotive boiler having a smokebox of conventional form but provided with a relatively small opening in one of its upright walls for the reception of a feed-water heater, in combination with a feed-water heater comprising suitable headers and a body of water tubes and extending through said opening into the path of the hot gases within said smokebox, an exhaust steam condenser inside of said heater, and means closing said opening.

35. A locomotive boiler having a smokebox of conventional form but provided with a relatively small opening in one of its upright walls for the reception of a feed-water heater, in combination with a feed-water heater comprising suitable headers and a body of water tubes and extending through said opening and into the path of the hot gases within said smokebox, an exhaust steam condenser inside of said heater, said condenser being withdrawable intact from said heater, and means closing said opening.

36. A locomotive boiler having a smokebox of conventional form but provided with a relatively small opening in one of its upright walls for the reception of a feed-water heater, in combination with a feed-water heater comprising suitable headers and a body of water tubes and extending through said opening and into the path of the hot gases within said smokebox, an exhaust steam condenser inside of said heater, said heater and condenser being withdrawable intact through said opening, and means normally closing said opening and yet leaving the end of the heater and condenser accessible upon the exterior of the smokebox.

37. A locomotive boiler having a smokebox of conventional form but provided with a relatively small opening in one of its upright walls for the reception of a feed-water heater, in combination with a feed-water heater comprising suitable headers and a body of water tubes and extending through said opening and into the path of the hot gases within said smokebox, and an exhaust steam condenser comprising a steam header upon the outer end of the heater and closed-end condenser tubes which occupy respective water tubes thereof.

38. A locomotive boiler and a smokebox, in combination with a feed-water heater positioned in the path of the hot gases in said smokebox, said heater comprising upper and lower groups of water tubes which constitute a tortuous course for the feed-water, means for supplying feed-water to said upper group of tubes and thence through the lower group and to the boiler, and exhaust steam condensing tubes positioned in respective water tubes of said upper group only.

39. A locomotive boiler and a smokebox, in combination with a feed-water heater positioned in the path of the hot gases in said smokebox, said heater comprising upper and lower groups of water tubes which constitute a tortuous course for the feed-water, means for supplying preheated feed-water to said upper group of tubes and thence through the lower group and to the boiler, exhaust steam condensing tubes positioned in respective tubes of said upper group only, and a suitably supplied and drained steam header wherewith said condenser tubes are connected.

40. A locomotive boiler and a smokebox, in combination with a feed-water heater positioned in the path of the hot gases in said smokebox, said heater comprising upper and lower groups of water tubes which constitute a tortuous course for the feed-water, said groups being accessible from the exterior of the smokebox and being removable therefrom intact, means for supplying feed-water to said upper group of tubes and thence through the lower group and to the boiler, exhaust steam condensing tubes positioned in respective tubes of said upper group, a suitably supplied and drained exhaust steam header wherewith said condenser tubes are connected, and all water and steam connections being located upon the exterior of the smokebox.

41. A locomotive boiler and a smokebox, in combination with a feed-water heater positioned in the path of the hot gases in said smokebox, said heater comprising a plurality of groups of water tubes which constitute a tortuous course for the feed-water, one end of each group of tubes being accessible from the exterior of the smokebox, means for supplying feed-water to said tubes and thence to the boiler, exhaust steam condensing tubes positioned in the tubes of one said group, an exhaust steam header through which said condenser tubes are supplied and drained and said header and condensing tubes being withdrawable intact from the water tubes without disturbing the latter in the smokebox.

42. A locomotive boiler and front-end, in combination with a multiple-water-tube feed-water superheater through which the boiler is fed, an exhaust steam condenser inside of said superheater, the water-tubes of said superheater being exposed to the hot gases within the front-end, water feeding means which supply the superheater with feed-water against boiler pressure, said superheater comprising a permanently assembled unit, and means permitting the same to be placed in and removed from the front-end without dismemberment.

43. A locomotive boiler with its firebox, flues and conventional front-end, in combination with a multiple-water-tube feed-water superheater through which the boiler is fed, said superheater being positioned within the upper part of said front-end to absorb heat from the flue gases, water-feeding means which supply the superheater with preheated feed-water at the rate required by the boiler, an exhaust steam condenser occupying a portion of the interior of said superheater to further heat the water entering the same, and means facilitating the removal of scale and sediment from the interior of the superheater.

44. A locomotive boiler and front-end, in combination with a plurality of water heating tubes through which the boiler is fed, said tubes extending into said front-end to be heated by the gases therein, feeding means for forcing the water through said tubes against boiler pressure, exhaust steam condensing tubes positioned in said water tubes, suitable means for supplying exhaust steam to one end of each condensing tube, the other end of each condensing tube being closed, and means for draining the same of condensate.

45. A locomotive boiler and front-end, in combination with a multiple-water-tube feed-water superheater positioned in the gas passage of said front-end, the tubes of said heater being at one end accessible from the exterior of the front-end, exhaust steam condensing tubes positioned in only a minority of said water tubes, and a suitably supplied and drained steam feeding arrangement for said condensing tubes adjacent the accessible ends to said water tubes.

46. The combination of a locomotive boiler and smokebox of conventional design, but having an aperture in its wall, with an exhaust steam feed-water preheater and a gas type feed-water superheater both positioned in the gas passage of the smokebox and insertable and removable as a single unit through said aperture in the wall thereof, said preheater and superheater being proportioned and positioned to first raise the feed-water to the temperature of exhaust steam by the combined action of exhaust steam and the smokebox gases and to subsequently use the hot gases to further raise the temperature of the feed-water.

47. The combination of a locomotive boiler and a smokebox of conventional design but having an aperture in its wall, with an exhaust steam feed-water preheater and a gas type feed-water superheater, both contained in said smokebox and which are insertable and removable as a single unit through said aperture in said smokebox wall.

48. A locomotive boiler and a smokebox having an aperture in its side wall, in combination with a feed-water heater normally exposed to the hot gases in said smokebox, said heater comprising a plurality of water tubes providing a tortuous water heating course through which the boiler is fed, said heater being adapted for withdrawal intact through said aperture, one end of said heater being normally positioned in said aperture in the smokebox wall and being there provided with disconnectable inlet and outlet water connections.

49. A locomotive boiler and a smokebox having an opening in its wall, in combination with a feed-water heater normally exposed to the hot gases in said smokebox, said heater comprising a header arrangement and a plurality of water tubes therewith providing a tortuous water course through which the boiler is fed and which course begins and ends in said header arrangement, the latter being positioned in said opening in the smokebox wall and there provided with disconnectable inlet and outlet water connections, and the heater as a whole being withdrawable through said opening without otherwise opening said smokebox.

50. A locomotive boiler and a smokebox having an opening in its side wall, in combination with a feed-water heater normally exposed to the hot gases in said smokebox, said heater being insertable and withdrawable intact through said opening and comprising two headers and a plurality of water tubes therewith providing a tortuous water course through which the boiler is fed and which course begins and ends in one of said headers, the latter header being normally positioned in said opening in the smokebox wall and being there provided with inlet and outlet water connections that are situated upon the exterior of the smokebox.

51. A locomotive boiler and a smokebox having an opening in its wall, in combination with a feed-water heater normally exposed to the hot gases in said smokebox, said heater comprising two headers and a plurality of water tubes therewith providing a tortuous water course through which the boiler is fed and which course begins and ends in one of said headers, the latter header being positioned in said opening in the smokebox wall and being there provided with disconnectable inlet and outlet water connections that are situated upon the exterior of the smokebox, and the heater as a whole being withdrawable through said opening.

52. A locomotive boiler and a smokebox having an opening in its wall, in combination with a feed-water heater normally exposed to the hot gases in said smokebox, said heater comprising two headers and a plurality of water tubes therewith providing a tortuous water course through which the boiler is fed and which course begins and ends in one of said headers, the latter header being positioned and exposed in said opening in the smokebox wall and being there provided with disconnectable inlet and outlet water connections that are situated upon the exterior of the smokebox, the heater as a whole being withdrawable through said opening, and said exposed header having a closure which may be removed, to expose the interior of the heater either before or after withdrawal.

53. A locomotive boiler and a smokebox having an opening in its side, in combination with a feed-water heater presenting a plurality of water heating tubes which normally occupy the smokebox and that are exposed to the hot gases therein, one end of said heater being secured in said opening in the side of the smokebox, and supporting rails extending across the smokebox, whereon the heater is slidable, and the heater as a whole being removable from the smokebox through said opening.

54. A locomotive boiler and a smokebox having an opening in its wall, in combination with a feed-water heater, said heater comprising two headers and a plurality of water tubes all normally exposed to the hot gases within the smokebox, said tubes and headers providing a tortuous water course through which the boiler is fed and which course begins and ends in one of said headers, the latter header being positioned in said opening in the smokebox wall and there provided with disconnectable inlet and outlet water connections, and fixed supports in said smokebox for the heater, whereon said heater is slidably withdrawable through said opening.

55. A steam locomotive front-end having an opening in one side, in combination with supporting rails extending across said front-end on the level of said opening, a drawer-like feed-water heater adapted to slide in and out of said opening upon said supports, said heater normally presenting a plurality of feed-water tubes to the front-end gases, feed-water inlet and outlet connections on the outer end of said heater, and means making said opening air-tight when the heater is in normal position.

56. A locomotive boiler and a front-end provided with an opening in its side, said front-end having the conventional arrangement of diaphragm, exhaust nozzle and stack for the continuous discharge of hot gases and cinders, in combination with a feed-water heater through which the boiler is fed, said heater presenting a plurality of water tubes to the hot gases within said front-end and being slidable endwise through said opening in the side of the front-end, means normally tightly closing said opening, and cinder breaking means normally supporting said heater in the front-end and whereon said heater is thus slidable.

57. A locomotive boiler and a front-end having an opening in its circumferential wall, in combination with a multiple-water-tube feed-water heater through which the boiler is fed, the water-tubes of said heater being exposed to the hot gases within the front-end, water feeding means which supply the heater with feed-water against boiler pressure, said heater comprising in itself a permanently assembled unit having one of its ends accessible upon the exterior of the front-end, and means permitting the heater to be placed in and removed through said opening in the front-end without dismemberment.

58. A locomotive boiler and a front-end having an opening in its circumferential wall, in combination with a multiple-water-tube feed-water superheater through which the boiler is fed, the water-tubes of said superheater being exposed to the hot gases within the front-end, water feeding means which supply the superheater with feed-water against boiler pressure, said superheater in itself comprising a permanently assembled unit, and means permitting the same to be placed in and removed from the front-end through said opening without dismemberment and without otherwise disarranging said front-end.

59. A locomotive boiler and a front-end having an opening in its wall, in combination with a feed-water superheater which is exposed to the hot gases of the front-end to absorb heat therefrom and through which the boiler is fed, said superheater extending horizontally into the front-end through said opening in the wall thereof, and having one end exposed in said opening, said superheater being withdrawable endwise therethrough, feeding means which supply the superheater with feed-water against boiler pressure, and means at the exposed end of said superheater facilitating the removal of scale and sediment therefrom either before or after withdrawal from the front-end.

60. A locomotive boiler and front-end with the conventional arrangement of diaphragm, exhaust nozzle, cinder screen and stack and having an opening in its side, in combination with a feed-water superheater which is exposed to the hot gases of the front-end to absorb heat therefrom and through which the boiler is fed, said superheater extending horizontally through said opening in the side of the front-end and occupying substantially all the conventional space between said screen and nozzle, water feeding means which supply the superheater with feed-water against boiler pressure, and said superheater as a whole being withdrawable endwise through said opening without disturbing the other parts in the front-end.

61. A locomotive boiler and front-end with the conventional arrangement of diaphragm, exhaust nozzle, cinder screen and stack, in combination with a feed-water superheater which is exposed to the hot gases of the front-end to absorb heat therefrom and through which the boiler is fed, said superheater extending crosswise of and occupying substantially all the conventional space between said screen and nozzle, water feeding means which supply the superheater with feed-water against boiler pressure, and means at the side of said front-end facilitating the removal of scale and sediment from the interior of said superheater without change in the described position of the same or other parts of the front-end.

62. A locomotive boiler and front-end with the conventional exhaust nozzle and stack, said front-end having an opening in its side forward of said nozzle, a feed-water heater comprising water headers and a plurality of water tubes connecting them, said feeder being of substantially the same length as the front-end is broad at said opening and said header without dismemberment being adapted for insertion and withdrawal through said opening.

63. A locomotive boiler and a smokebox having a recessed opening in its sides, in combination with a feed-water heater normally exposed to the hot gases in said smokebox, said heater comprising two headers and a plurality of water tubes therewith providing a tortuous water course through which the boiler is fed and which course begins and ends in one of said headers, the latter header being positioned and exposed in said recessed opening in the side of the smokebox, such exposed header being provided with inlet and outlet water connections upon the exterior of the smokebox, and said exposed header being substantially conformed to the side of the smokebox, to avoid obscuring the vision of the locomotive crew.

64. A locomotive boiler, cab and smokebox, in combination with a feed-water heater within and positioned crosswise of said smokebox, the latter having an opening in its side wherein the end of the heater is held and through which opening the heater is removable, and the said side being recessed adjacent said opening to the extent required to substantially hide the end of the heater from view from said cab.

65. A locomotive boiler, cab and cylindrical front-end, the latter having an opening in its side, in combination with a feed-water heater within and positioned crosswise of said front-end, the end of the heater being held in said opening in the side of the front-end and through which opening the heater is removable, the said side being recessed adjacent said opening to hide the end of the heater and substantially preserve the cylindrical appearance of said front-end.

66. A locomotive smokebox having an opening in its side, in combination with a door frame fixed in said opening and externally contoured to the curved side of the smokebox, said frame presenting a flat bottom flange inward of said curved side, and a feed-water heater having its end accommodated in the opening in said flat bottom flange and provided with a complementary flange that is normally fastened to said flange of the door frame.

67. A locomotive smokebox having welded in its curved side a recessed door frame 48 which is externally contoured to said curved side and that presents a flat flange 48''' inward of said curved side of the smokebox, and a feed-water heater having an end accommodated in said door frame and provided with a complementary flat flange that is detachably fastened to the flange 48''' of the door frame.

68. A locomotive smokebox having an opening in its side in combination with a door frame fixed in said opening and externally contoured to the curved side of the smokebox, said frame presenting a flat bottom flange that is pitched within the curvature of said side, and a feed-water heater horizontally disposed in said smokebox and having its end accommodated in the opening in said flat bottom, said end having a flat complementary pitched flange which is normally fastened to said bottom flange.

69. A locomotive smokebox having a recessed door frame in its side, in combination with a feed-water heater comprising two headers and a plurality of water tubes connecting them, said heater extending crosswise of the upper part of said smokebox, one said header being substantially conformed to one side of the smokebox and being accommodated in said recessed door frame and the other header being positioned adjacent the opposite side of the smokebox and conformed to the curvature thereof.

70. A locomotive smokebox having an opening in its side, in combination with a recessed door frame welded in said opening, said frame presenting an apertured flat bottom-flange inward of said curved side, a feed-water heater having its end accomodated in the aperture of said flange and said end of the heater having a complementary flange that is normally fastened to said flange of the door frame.

71. A locomotive metal smokebox having an opening in its side, in combination with a recessed metal door frame having its outer edges welded to the smokebox at the margins of said opening and presenting a flat bottom-flange that is pitched within the curvature of said side, and a feed-water heater horizontally disposed in said smokebox and having its end accommodated in and substantially hidden by said door frame, and said end having a flat complementary pitched flange normally bolted to the pitched flange of the door frame.

72. A locomotive boiler and front-end with the conventional arrangement of diaphragm, exhaust nozzle, cinder screen and stack, for the continuous discharge of hot gases, vapors and cinders, in combination with a multiple-water-tube feed-water superheater through which the boiler is fed, said superheater being exposed to the hot gases within, and occupying substantially all of the conventional space between said screen and nozzle, said screen serving to convert the cinders into small scouring particles that continuously blast the exposed surfaces of the superheater and keep them clean, primary water-feeding-and-heating means which supply the superheater with feed-water at the rate required by the boiler and at temperatures that prevent the condensation of vapors upon such cleaned surfaces of the superheater, and the superheater being withdrawable as a unit from said front-end without opening or disturbing the other parts of said front-end.

73. A locomotive boiler and its front-end with the conventional arrangement of diaphragm, exhaust nozzle, cinder screen and stack for the continuous discharge of hot gases, vapors and cinders, in combination with a multiple-water-tube feed-water heater through which the boiler is fed, the tubes of said heater extending crosswise of said front-end, each exposed to the hot gases and together occupying substantially all of the conventional transverse space between said screen and the blast from said nozzle, feeding means which supply the heater with feed-water, and said screen serving to convert the cinders into a continuous blast of scouring particles which, seeking escape through the stack, pass between and externally clean the tubes of the heater.

74. A locomotive boiler and its front-end with the conventional arrangement of diaphragm, exhaust nozzle, and stack for the continuous discharge of hot gases and vapors, in combination with a feed-water superheater through which the boiler is fed, said superheater comprising many closely spaced water tubes extending crosswise of said front-end and each exposed to the hot gases therein, primary water-feeding-and-heating means which supply the superheater with feed-water at temperatures that prevent the condensation of vapors upon the tubes thereof, and means enabling the removal of solids from the interior of the tubes of the superheater.

75. The combination of a locomotive boiler and its smokebox with an exhaust steam feed-water pre-heater and a gas-type feed-water superheater both positioned within the smokebox and receiving heat from the hot gases therein, means for feeding water first to the preheater, thence to the superheater and thence to the boiler, said pre-heater being adapted to raise the feed-water to the temperature of exhaust steam by the absorption of heat from both exhaust steam and the smokebox gases and said superheater being adapted to further raise the temperature of the feed-water solely by the absorption of heat from said gases.

76. A locomotive boiler having a smokebox of conventional form but provided with a relatively small opening in one of its upright walls for the reception of a feed-water heater, in combination with a feed-water heater through which the boiler is fed, said heater comprising an elongated body composed of groups of water tubes that provide a tortuous water course which begins and ends at one end of said elongated body, said body being adapted for endwise movement in and out of said opening in the smokebox wall, and means normally closing said opening to prevent leakage of air into said smokebox.

77. A locomotive front-end having an opening in its side, in combination with a feed-water heater transversely positioned in said front-end and adapted for endwise withdrawal and replacement through said opening in its side, external feed-water connections normally coupled to the outer end of said heater within the confines of said opening, said outer end of the heater being normally rigidly attached to the front-end, and the inner end of the heater only approaching the opposite side of the front-end.

78. A locomotive front-end having an opening in its side, in combination with a feed-water heater transversely positioned in said front-end and adapted for endwise withdrawal and replacement through said opening in its side, external feed-water connections normally coupled to the outer end of said heater within the confines of said opening, said outer end of the heater being normally rigidly attached to the front-end, the inner end of the heater only approaching the opposite side of the front-end, and transversely positioned supports in said front-end wherewith the inner end of the heater is loosely engaged.

79. A locomotive front-end having an opening in its side, in combination with a feed-water heater transversely positioned in said front-end and adapted for endwise withdrawal and replacement through said opening in its side, external feed-water connections normally coupled to the outer end of said heater within the confines of said opening, said outer end of the heater being normally rigidly attached to the front-end, transversely positioned detachable supports in said front-end wherewith the inner end of the heater is normally loosely engaged, and said supports being removable from the front-end through said opening following the withdrawal of the heater from the front-end.

80. A locomotive front-end of conventional cylindrical form and having an opening in its side, in combination with a "universal" or initially adjustable metal door-frame in said opening for the reception of a feed-water heater having a complementary outer end that must be tightly joined to said side to prevent leakage of air into said front-end, said frame being of a recessed formation presenting an apertured bottom portion suited to the shape of and detachably jointed to said end of the heater, and said frame being distinguished by parallel side flanges 48', 48' and divergent top and bottom flanges 48", 48", all presenting marginal portions conformed to the margins of said opening in the side of the front-end and autogenously welded thereto, the parallelism of said side flanges and the divergence of said top and bottom flanges permitting the initial adjustment of the frame in the side of the front-end as required to harmonize said frame and heater with the curvature of the side of the front-end and the position of the opening therein.

81. A locomotive boiler and conventional front-end, the latter having an opening in its curved side, in combination with a tubular feed-water heater extending through said opening and transversely across said front-end, said heater comprising several groups of water tubes and a header therefor, said header being normally positioned in said opening and comprising water containing portions belonging to the several groups of tubes and vertically staggered with respect to one another to substantially conform said header to the curved side of the front-end.

82. A locomotive boiler and conventional front-end, the latter having an opening in one of its curved sides, in combination with a feed-water heater extending through said opening and transversely across said front-end, said heater comprising several groups of water tubes and opposed headers therefor, said groups being of different lengths, one said header being positioned in said opening and the other positioned adjacent the opposite side of the front-end, said headers each comprising water-containing portions belonging to respective groups of tubes and in perpendicular relation thereto but vertically staggered with respect to one another to suit the different lengths of the tubes and to substantially conform the header as a whole to the respectively adjacent curved side of the front-end.

83. A feed-water heater adapted for transverse positionment in the upper part of a locomotive front-end, said heater comprising at least two groups of water tubes and a header, said groups being positioned one above the other and of different lengths to suit the shape and width of the front-end in which the heater is to be used, said header presenting a tube sheet of a stepped formation conforming it to the shape of the side of such front-end and adapting it to perpendicularly receive the different groups of tubes, and said header being completed by a cap plate of like stepped formation.

84. A feed-water heater adapted for transverse positionment in the upper part of a locomotive front-end, said heater comprising a plurality of groups of water tubes and two headers, said groups being positioned one above the other and of different lengths to suit the shape and width of the front-end in which the heater is to be used, each said header presenting a tube sheet of a stepped formation conforming it to the shape of the respective side of such front-end and yet adapting it to perpendicularly receive the different groups of tubes, and said header being completed by a cap plate of like stepped formation, bolted to the tube sheet.

85. A feed-water heater adapted for transverse positionment in the upper part of a locomotive front-end, said heater comprising a plurality of groups of water tubes and two headers, said groups positioned one above the other and being of different lengths to suit the shape and width of the front-end in which the heater is to be used, each said header presenting a tube sheet of a stepped formation conforming it to the shape of the respective side of such front-end and yet adapting it to perpendicularly receive the different groups of tubes, each said header being completed by a cap plate bolted to the tube sheet and of similar stepped formation, and stays extending through certain of said tubes and fastened in the cap plates of the two headers to prevent the distortion thereof by the internal pressure to which the heater is subjected in use.

86. A feed-water heater adapted for transverse positionment in the upper part of a locomotive front-end, said heater comprising a header and at least two groups of water tubes positioned one above the other and or different lengths to suit the shape and width of the front-end in which the heater is to use used, said header presenting a tube sheet of a stepped formation adapting it to perpendicularly receive the different groups of tubes, said tube sheet having a marginal flange presenting a flat packing surface at an angle generally conforming the header to the shape of one side of the front-end, and said header being completed by a cap plate of like stepped formation and having a flat marginal flange bolted to said flange of the tube sheet.

87. A feed-water heater adapted for transverse positionment in the upper part of a locomotive front-end, said superheater comprising oppositely inclined headers and at least two groups of water tubes, together substantially conforming to the shape and width of the front-end in which the heater is to be used, each header being marginally flat but presenting recessed stepped portions adapted to perpendicularly receive respective groups of tubes, each header having a cap plate that is bolted thereto and has complementary stepped portions that provide water spaces, and said tubes and water spaces constituting a tortuous water course that begins and ends in one of said headers.

88. A locomotive front-end having a door frame in its side and presenting a flat packing flange about its door opening, a multiple-tube feed-water heater of a cross section smaller than said door opening adapting the heater for insertion and withdrawal through said door opening, said heater having an outer header wherein its tubes are secured, said header presenting a packing flange that closes said opening and is normally bolted to the flange of the door frame, the water inlet and outlet connections of the header extending outward through said flange and said header having upon its exterior closure means that may be removed to permit internal access to said tubes without disturbing said inlet and outlet connections.

89. A locomotive feed-water heater of the gas type comprising opposed headers and straight water tubes connecting them, each of said headers having a removable cap or end, an exhaust steam header upon one of said removable ends, steam condensing tubes extending from the steam header into respective water tubes, the ends of said condensing tubes being closed at points remote from said steam header, and a condensate drain for said steam header.

In testimony whereof, I have hereunto set my hand this 31st day of January, 1921.

LELAND G. PLANT.